(12) United States Patent
Lee

(10) Patent No.: US 9,898,639 B2
(45) Date of Patent: Feb. 20, 2018

(54) FINGERPRINT SENSOR, ELECTRONIC DEVICE HAVING THE SAME, AND METHOD OF OPERATING FINGERPRINT SENSOR

(71) Applicant: Samsung Electronics Co., Ltd., Suwon-si, Gyeonggi-do (KR)

(72) Inventor: Choong-Hoon Lee, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/168,241

(22) Filed: May 30, 2016

(65) Prior Publication Data
US 2017/0046555 A1    Feb. 16, 2017

(30) Foreign Application Priority Data

Aug. 12, 2015   (KR) .................. 10-2015-0113570

(51) Int. Cl.
*G06K 9/28* (2006.01)
*G06K 9/00* (2006.01)
(52) U.S. Cl.
CPC .................. *G06K 9/0002* (2013.01)
(58) Field of Classification Search
CPC .................................................. G06K 9/0002
See application file for complete search history.

(56) References Cited

U.S. PATENT DOCUMENTS

| | | | | |
|---|---|---|---|---|
| 6,438,257 B1 * | 8/2002 | Morimura | .......... | G01R 27/2605 382/108 |
| 7,084,642 B2 * | 8/2006 | Gozzini | ............... | G06K 9/0002 324/663 |
| 7,298,875 B2 | 11/2007 | Kim et al. | | |
| 7,848,550 B2 | 12/2010 | Mathiassen et al. | | |
| 8,131,027 B2 | 3/2012 | Mizushima et al. | | |
| 2003/0102874 A1 * | 6/2003 | Lane | .................... | G06K 9/0002 324/662 |
| 2009/0067684 A1 * | 3/2009 | Mainguet | ............. | G06K 9/0002 382/124 |
| 2015/0078636 A1 | 3/2015 | Carver et al. | | |
| 2015/0093032 A1 * | 4/2015 | Nakao | .................. | G06K 9/6293 382/195 |
| 2016/0141326 A1 * | 5/2016 | Hanzawa | .......... | H01L 27/14603 250/208.1 |

FOREIGN PATENT DOCUMENTS

| | | |
|---|---|---|
| KR | 20040081886 A | 9/2004 |
| KR | 20040095920 A | 11/2004 |
| KR | 100473383 | 3/2005 |
| KR | 101021134 | 3/2011 |
| KR | 20120138886 A | 12/2012 |

* cited by examiner

*Primary Examiner* — Brian P Werner
(74) *Attorney, Agent, or Firm* — Renaissance IP Law Group LLP

(57) ABSTRACT

A fingerprint sensor, comprising: a pixel array including a plurality of unit pixels arranged in rows and columns, each of the plurality of unit pixels including: a sensing electrode configured to form a detection capacitor; and a signal generation circuit configured to generate an analog signal based on a capacitance of the detection capacitor; and a controller configured to control an operation of the pixel array, wherein the controller is configured to electrically connect sensing electrodes of at least two unit pixels adjacent to each other and activate only one of the signal generation circuits included in the at least two unit pixels to generate the analog signal.

20 Claims, 20 Drawing Sheets

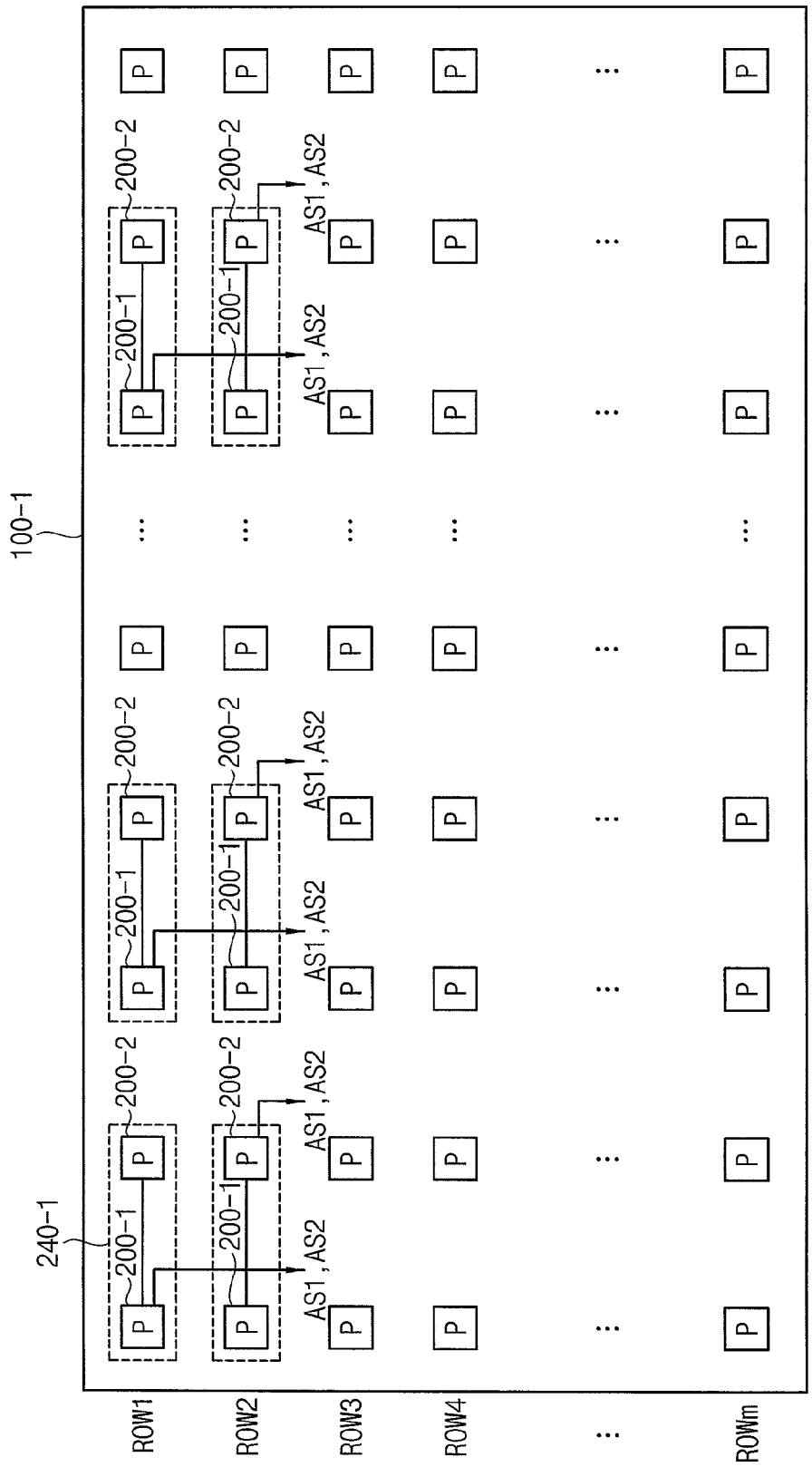

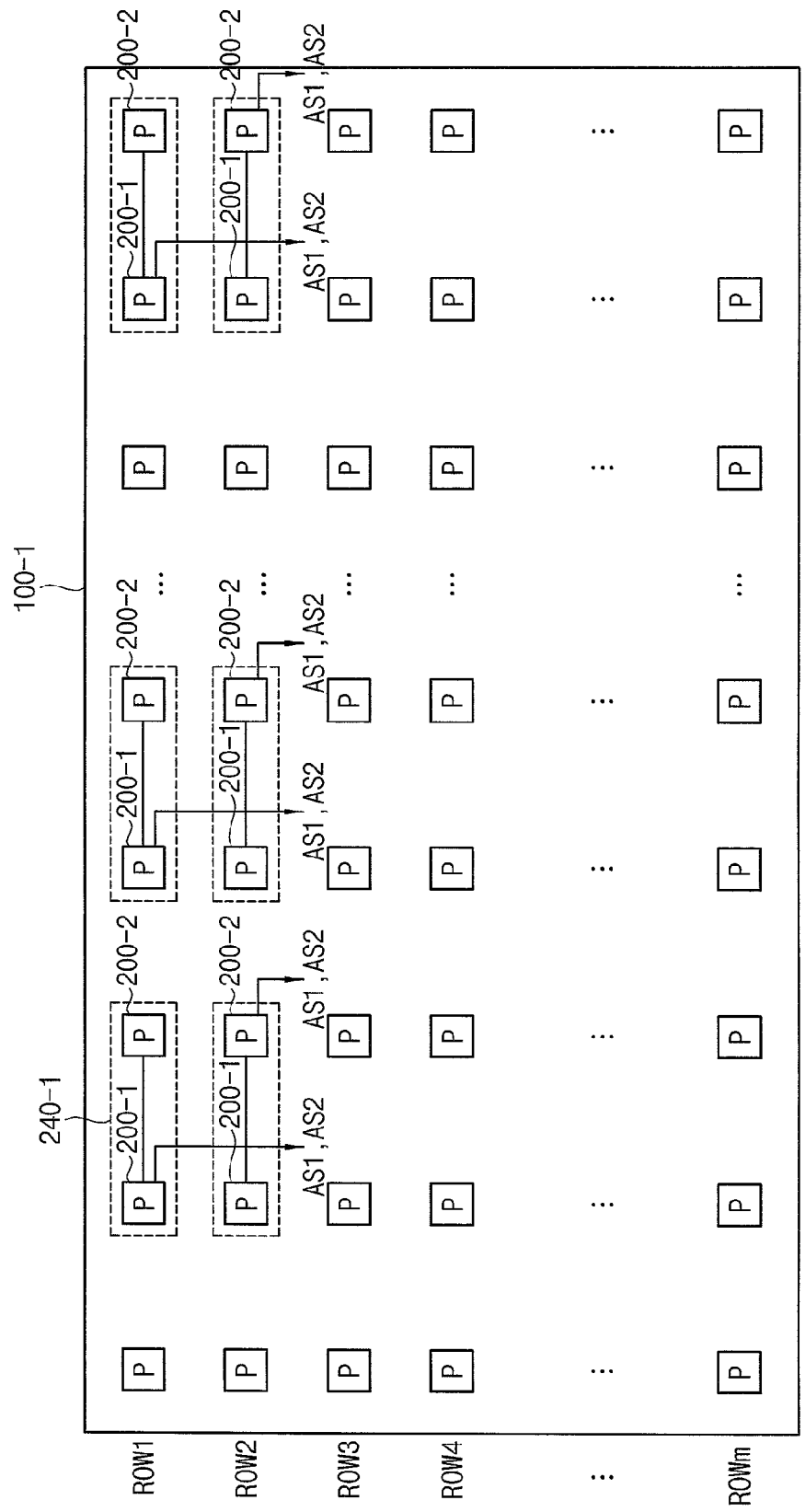

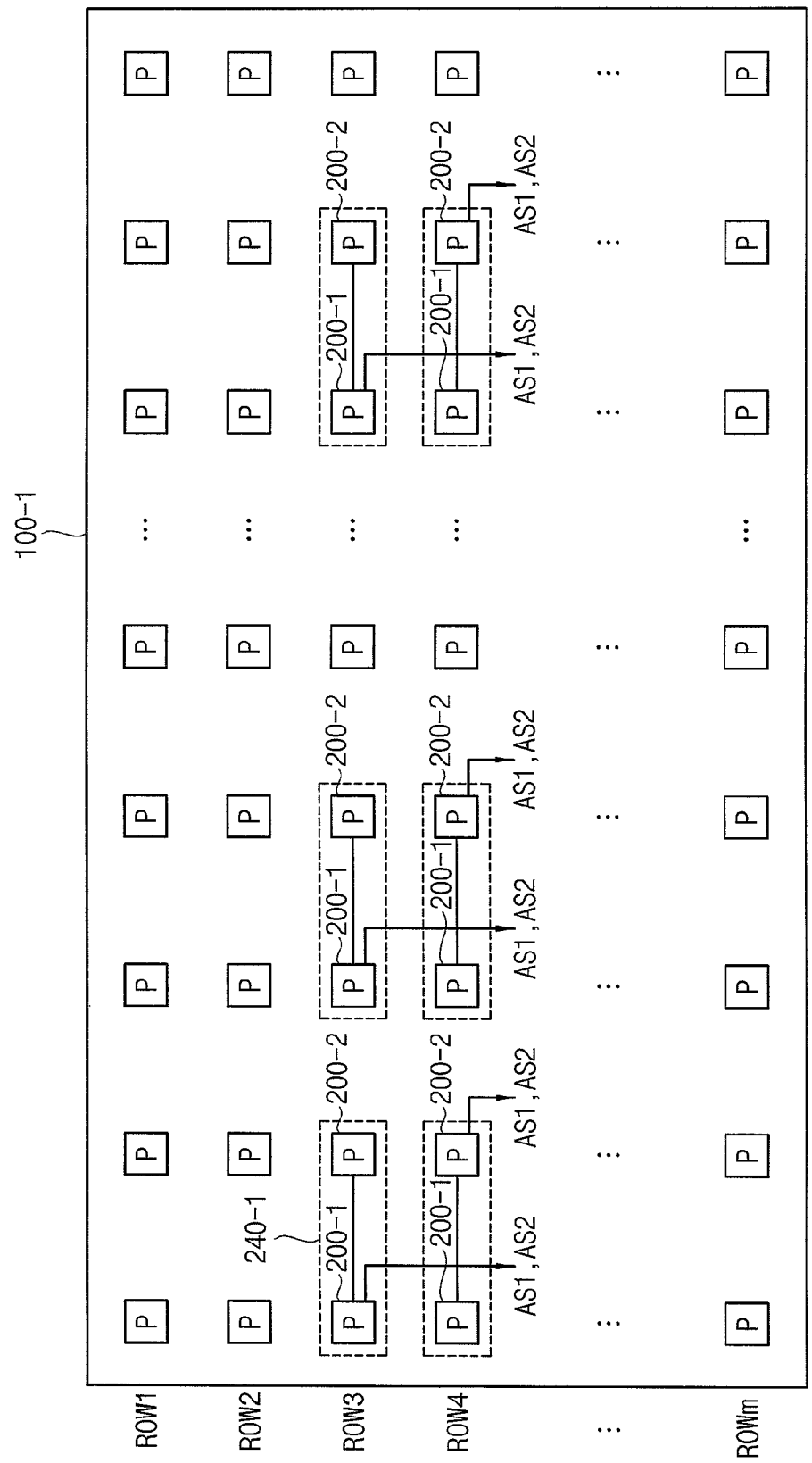

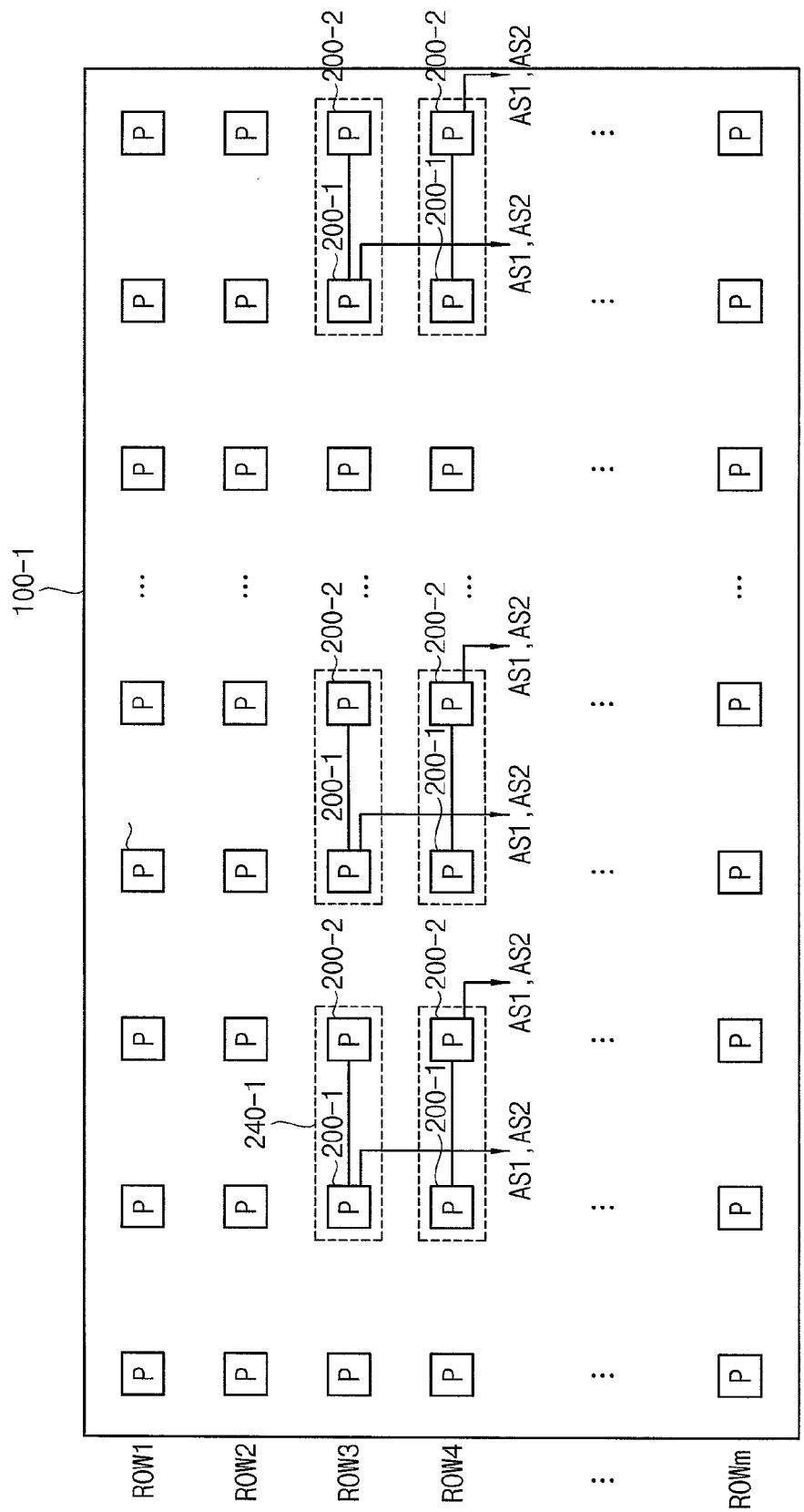

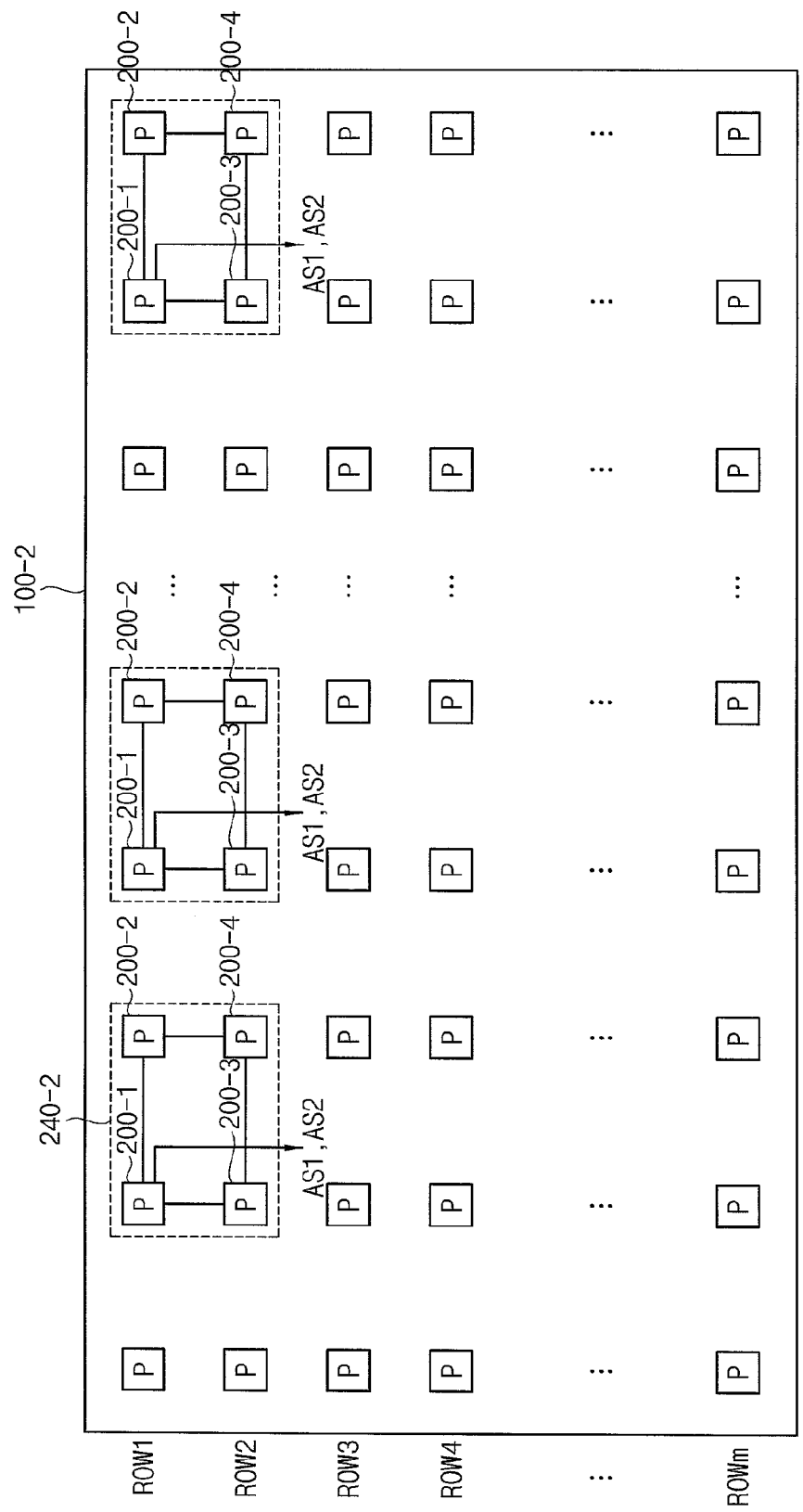

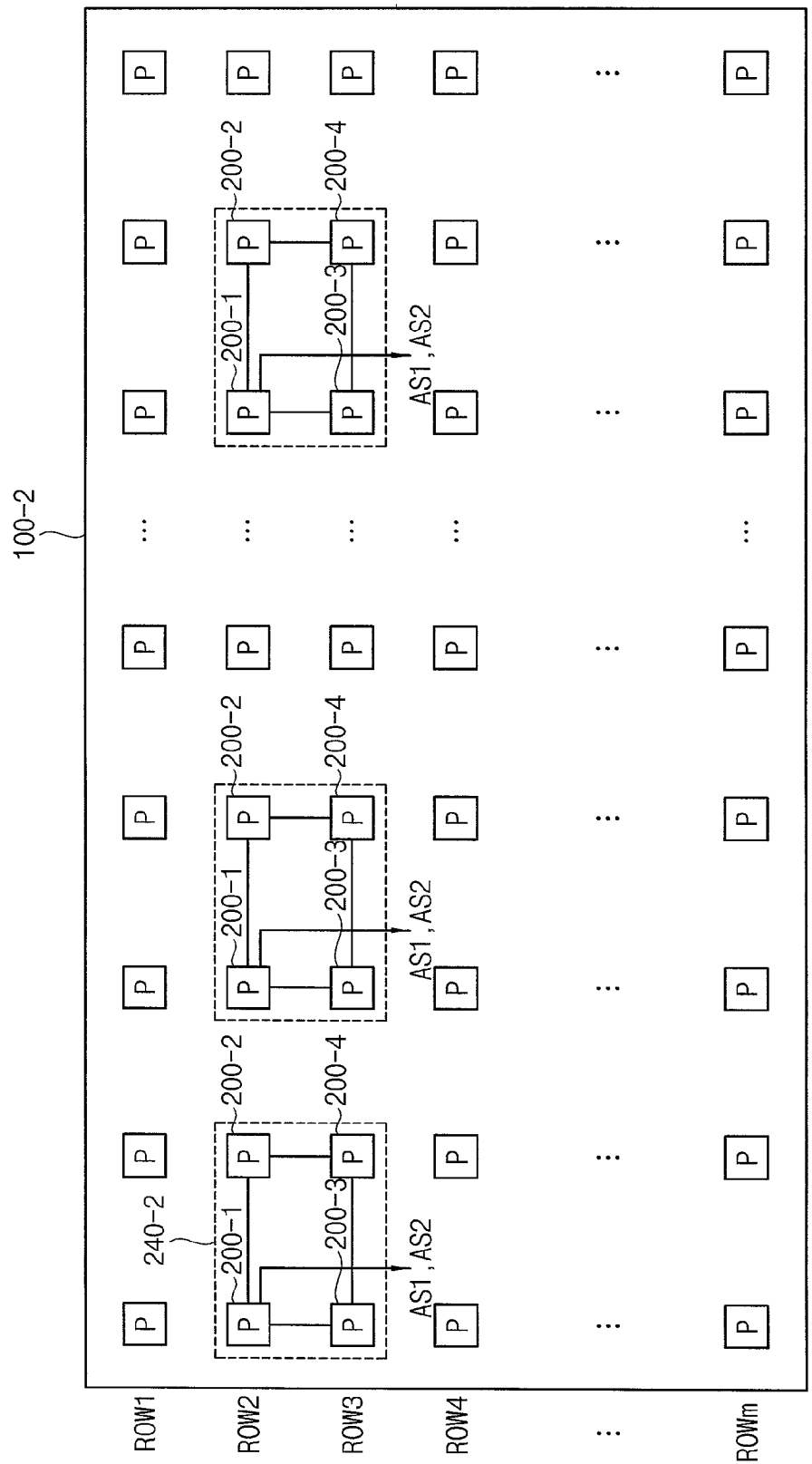

FINGERPRINT SENSOR, ELECTRONIC DEVICE HAVING THE SAME, AND METHOD OF OPERATING FINGERPRINT SENSOR

CROSS-REFERENCE TO RELATED APPLICATION(S)

This application claims priority under 35 USC § 119 to Korean Patent Application No. 10-2015-0113570, filed on Aug. 12, 2015 in the Korean Intellectual Property Office (KIPO), the contents of which are herein incorporated by reference in their entirety.

BACKGROUND

1. Technical Field

Embodiments relate to a fingerprint sensor, and more particularly to a fingerprint sensor having an increased sensing performance while maintaining a high resolution.

2. Description of the Related Art

Generally, a fingerprint sensor obtains a fingerprint image of a finger by detecting a capacitance between a sensing electrode and a finger. For example, a fingerprint sensor may obtain a fingerprint image of a finger based on a capacitance between the finger and a sensing electrode included in a pixel on which a ridge of a fingerprint is located and a capacitance between the finger and a sensing electrode included in a pixel on which a valley of the fingerprint is located. When a resolution of the fingerprint sensor is increased, a size of a pixel included in the fingerprint sensor is reduced.

However, when a size of a pixel reduces, a size of the sensing electrode included in the pixel also reduces, such that a capacitance between the sensing electrode and a finger decreases. Therefore, when the size of a pixel reduces, a sensing performance of the fingerprint sensor decreases.

SUMMARY

An embodiment includes a fingerprint sensor, comprising: a pixel array including a plurality of unit pixels arranged in rows and columns, each of the plurality of unit pixels including: a sensing electrode configured to form a detection capacitor; and a signal generation circuit configured to generate an analog signal based on a capacitance of the detection capacitor; and a controller configured to control an operation of the pixel array, wherein the controller is configured to electrically connect sensing electrodes of at least two unit pixels adjacent to each other and activate only one of the signal generation circuits included in the at least two unit pixels to generate the analog signal.

An embodiment includes an electronic device, comprising: a plurality of sensing electrodes; a plurality of signal generation circuits, each signal generation circuit configured to generate a signal based on a capacitance coupled to an input of the signal generation circuit; and a controller configured to selectively electrically connect groups of the sensing electrodes to the inputs of the signal generation circuits where each group of sensing electrodes is electrically connected to a corresponding single signal generation circuit of the signal generation circuits.

An embodiment includes a method of operating a fingerprint sensor including a plurality of unit pixels arranged in rows and columns, each of the plurality of unit pixels including a sensing electrode and a signal generation circuit, the method comprising: electrically connecting sensing electrodes included in at least two unit pixels adjacent to each other; turning on one of the signal generation circuits of the at least two unit pixels; turning off rest of the signal generation circuits of the at least two unit pixels; generating, by the turned-on signal generation circuit, an analog signal having a magnitude proportional to a sum of capacitances of detection capacitors including the sensing electrodes of the at least two unit pixels; and generating a digital signal representing a fingerprint pattern of a user based on the analog signal.

BRIEF DESCRIPTION OF THE DRAWINGS

Illustrative, non-limiting embodiments will be more clearly understood from the following detailed description in conjunction with the accompanying drawings.

FIGS. 12A to 13D are diagrams for describing a process for a controller to operate the pixel array of FIG. 11.

DETAILED DESCRIPTION OF THE EMBODIMENTS

Figure 1:
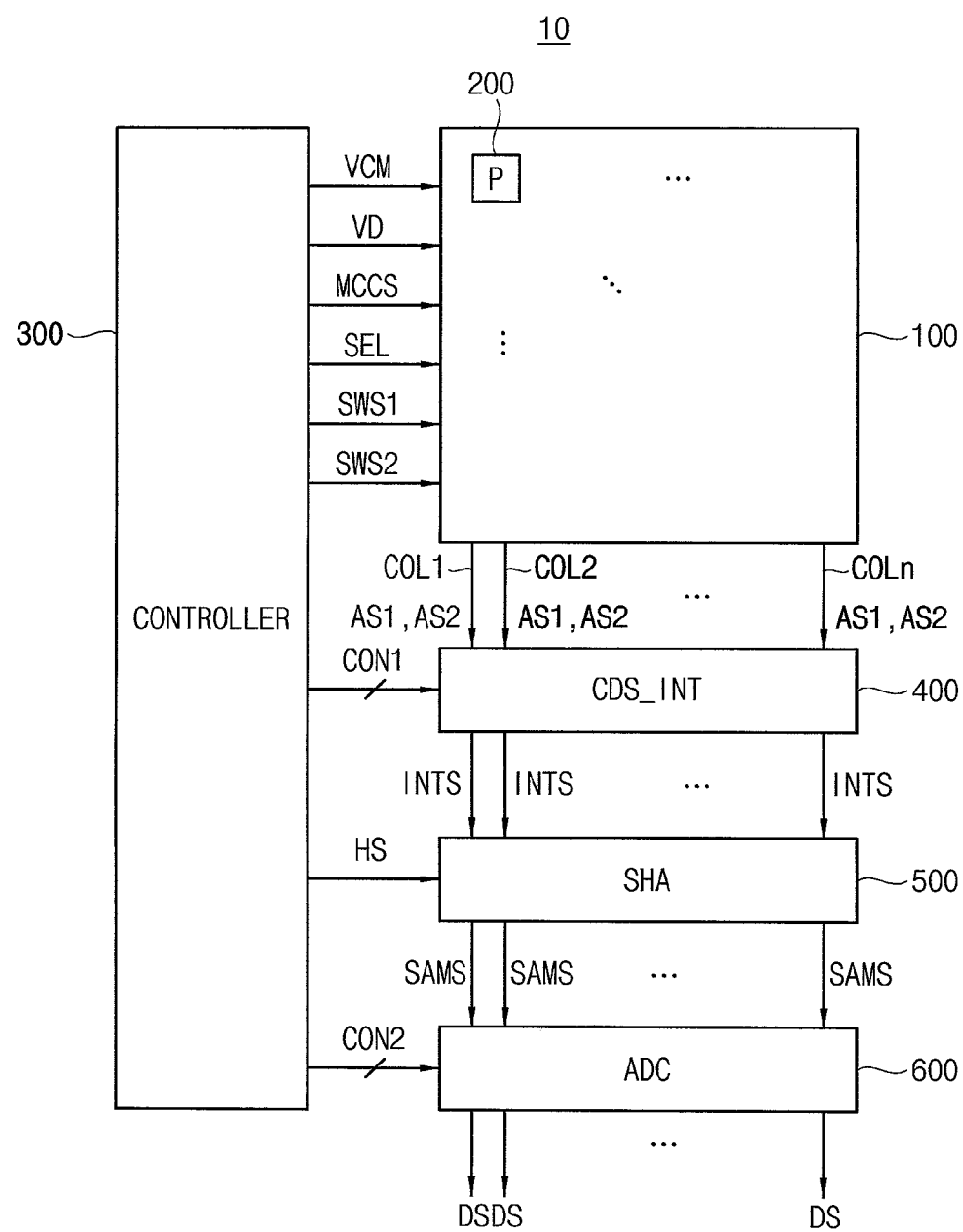
FIG. 1 is a block diagram illustrating a fingerprint sensor according to some embodiments.

Various embodiments will be described more fully with reference to the accompanying drawings, in which particular embodiments are shown. Embodiments may, however, take many different forms and should not be construed as limited to the particular embodiments set forth herein. Rather, these embodiments are provided so that this disclosure will be thorough and complete, and will fully convey the scope to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a fingerprint sensor according to some embodiments. Referring to FIG. 1, a fingerprint sensor 10 includes a pixel array 100, a controller 300, a correlated double sampling and integration circuit CDS_INT 400, a sample and hold circuit SHA 500, and an analog-to-digital converter ADC 600.

The pixel array 100 may include multiple unit pixels P 200 arranged in rows and columns.

The controller 300 may be configured to provide a common voltage VCM and a detection voltage VD to each of the unit pixels 200. In addition, the controller 300 may be configured to control an operation of the pixel array 100 in a unit of a row using a multiple connection control signal MCCS, a selection control signal SEL, a first switch signal SWS1, and a second switch signal SWS2.

When a finger contacts on the pixel array 100, each of the unit pixels 200 included in the pixel array 100 may be configured to generate an analog signal by detecting a fingerprint pattern of the finger. In some embodiments, the unit pixels 200 may be configured to output the analog signal corresponding to the fingerprint pattern through multiple column lines COL1, COL2, . . . , COLn in a unit of a row. Here, n represents a positive integer.

Figure 2:
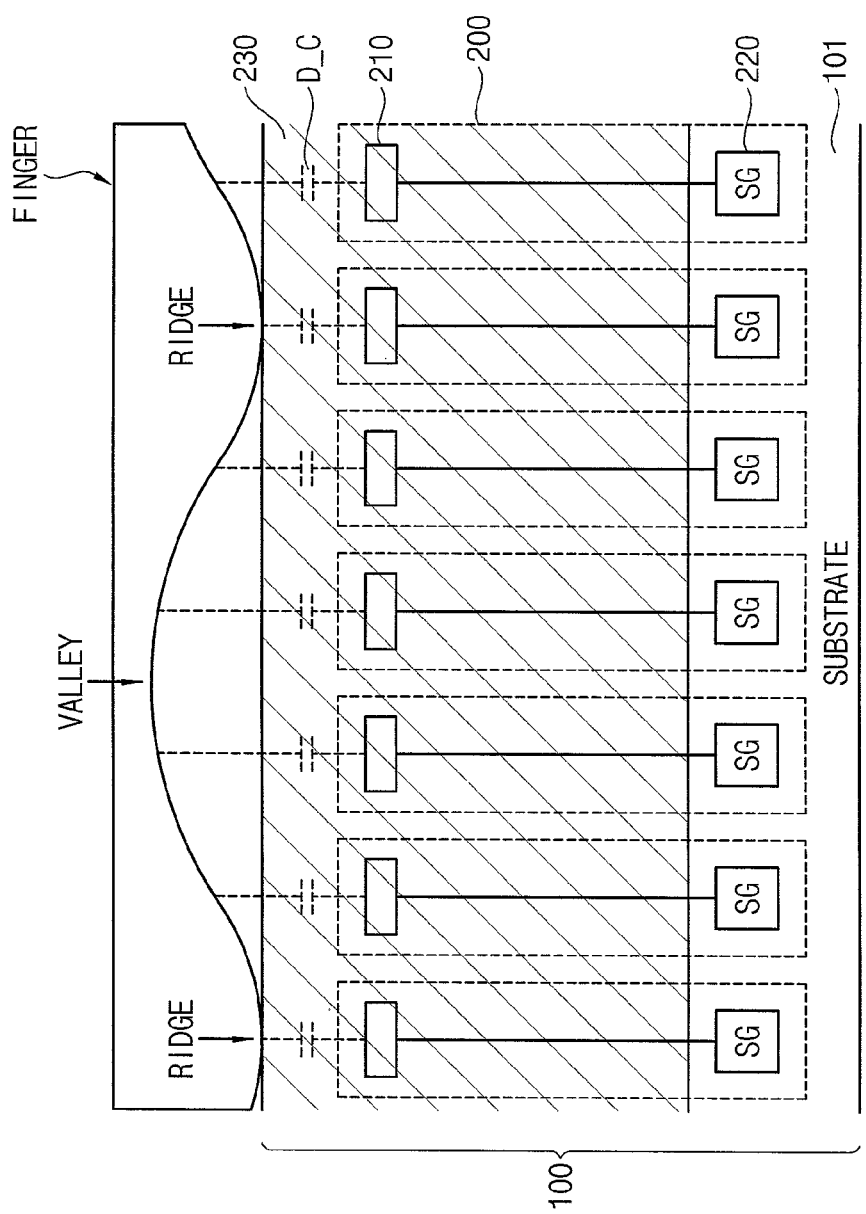
FIG. 2 is a cross-sectional view illustrating an example of a pixel array included in the fingerprint sensor of FIG. 1.

FIG. 2 is a cross-sectional view illustrating an example of a pixel array included in the fingerprint sensor of FIG. 1. Referring to FIG. 2, each of the unit pixels 200 included in the pixel array 100 may include a sensing electrode 210, which is formed above a semiconductor substrate 101, and a signal generation circuit SG 220, which is formed on the semiconductor substrate 101. The sensing electrode 210 included in each of the unit pixels 200 may be electrically connected to the corresponding signal generation circuit 220.

In some embodiments, the sensing electrode 210 may be implemented as a metal plate including a metal material. However, in other embodiments, the sensing electrode 210 may be formed of other conductive materials.

The pixel array 100 may further include an insulation layer 230, which is formed above the semiconductor substrate 101 and covers the sensing electrode 210 of each of the unit pixels 200. In some embodiments, at least a portion of the insulation layer 230 formed above the sensing electrode 210 may include glass.

FIG. 2 represents a state when a finger is on the insulation layer 230 included in the pixel array 100. When the finger contacts on the pixel array 100, the finger may operate as an electrode. Therefore, the sensing electrode 210 included in each of the unit pixels 200 may form a detection capacitor D_C together with the finger.

Generally, a fingerprint of a person has an intrinsic pattern formed by ridges and valleys. Therefore, as illustrated in FIG. 2, a distance between the finger and the sensing electrode 210 included in the unit pixel 200 on which a ridge of the fingerprint is located may be smaller than a distance between the finger and the sensing electrode 210 included in the unit pixel 200 on which a valley of the fingerprint is located.

Since a capacitance of a capacitor is inversely proportional to a distance between two electrode of the capacitor, a capacitance of the detection capacitor D_C formed by the sensing electrode 210 included in the unit pixel 200 on which a ridge of the fingerprint is located may be greater than a capacitance of the detection capacitor D_C formed by the sensing electrode 210 included in the unit pixel 200 on which a valley of the fingerprint is located.

The signal generation circuit 220 included in each of the unit pixels 200 may be configured to generate the analog signal based on a capacitance of the detection capacitor D_C formed by the corresponding sensing electrode 210.

In an operation of the fingerprint sensor 10, when the finger contacts on the pixel array 100, the controller 300 may electrically connect the sensing electrodes 210, which are included in at least two unit pixels 200 adjacent to each other in a column direction, turn on one of the signal generation circuits 220 included in the at least two unit pixels 200, and turn off rest of the signal generation circuits 220 included in the at least two unit pixels 200.

Therefore, the turned-on signal generation circuit 220 among the signal generation circuits 220 included in the at least two unit pixels 200 may generate the analog signal having a magnitude proportional to a sum of capacitances of the detection capacitors D_C formed by the sensing electrodes 210 included in the at least two unit pixels 200.

Although electrically connecting the sensing electrodes 210 of at least two unit pixels 200 adjacent in a column direction has been used as an example, other groupings of sensing electrodes 210 may be electrically connected to a signal generation circuit 220. For example, in some embodiments, the sensing electrodes 210 of at least two unit pixels 200 adjacent in a row direction may be electrically connected together. In a specific example, two sensing electrodes 210 adjacent to each other may be electrically connected together and to a signal generation circuit 220. In another example, in some embodiments, sensing electrodes 210 of at least two unit pixels 200 adjacent in both a column direction and a row direction may be electrically connected together. For example, four sensing electrodes 210 in a square or rectangular pattern may be electrically connected together. Furthermore, although an orientation of rows and columns of the sensing electrodes 210 have been used as an example, the sensing electrodes 210 may be arranged in a different organization and adjacent sensing electrodes 210 may be electrically connected. For example, the sensing electrodes 210 may be organized in a hexagonal grid.

The operation of the fingerprint sensor 10 will be described in detail with reference to FIGS. 3 to 9.

Figure 3:
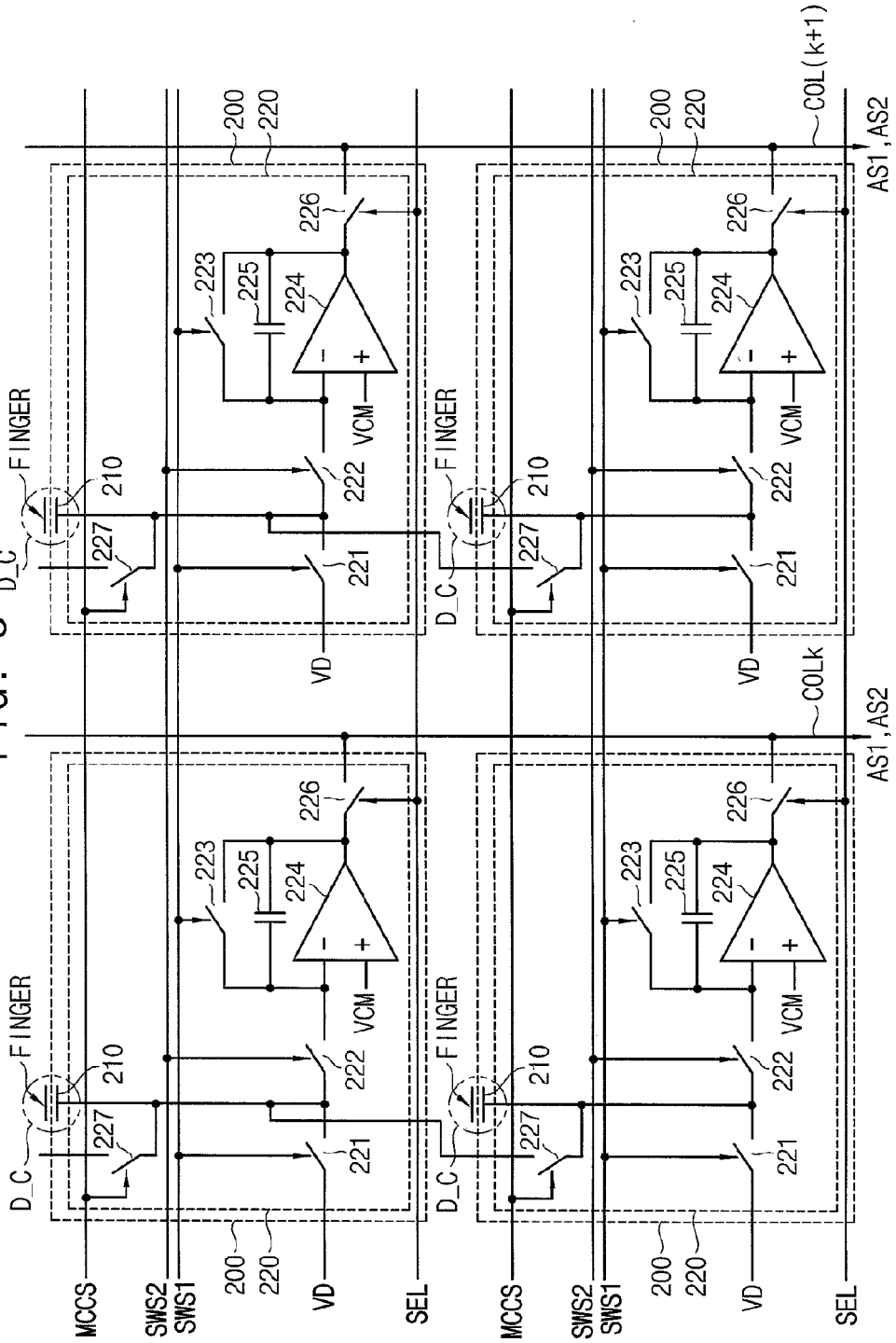
FIG. 3 is a circuit diagram illustrating an example of a pixel array included in the fingerprint sensor of FIG. 1.

FIG. 3 is a circuit diagram illustrating an example of a pixel array included in the fingerprint sensor of FIG. 1. In FIG. 3, four unit pixels 200 that are adjacent to each other in a row direction and in a column direction are illustrated. The sensing electrodes 210 included in each of the unit pixels 200 may form the detection capacitor D_C together with the finger contacted on the pixel array 100.

The signal generation circuit 220 may include a first switch 221, a second switch 222, a third switch 223, an amplifier 224, a feedback capacitor 225, a selection switch 226, and a multiple connection switch 227.

The amplifier 224 may include a negative input electrode, a positive input electrode, and an output electrode. The positive input electrode of the amplifier 224 may receive the common voltage VCM provided by the controller 300.

The first switch 221 may be turned on in response to a first switch signal SWS1 provided by the controller 300. When the first switch 221 is turned on, the first switch 221 may provide the detection voltage VD, which is provided by the controller 300, to the sensing electrode 210.

The second switch 222 may be coupled between the negative input electrode of the amplifier 224 and the sensing electrode 210. The second switch 222 may be turned on in response to a second switch signal SWS2 provided by the controller 300. When the second switch 222 is turned on, the sensing electrode 210 may be coupled to the negative input electrode of the amplifier 224.

In some embodiments, to increase an amplification gain of the amplifier 224, the detection voltage VD may be higher than a supply voltage with which the amplifier 224 operates. In addition, a voltage level of the first switch signal SWS1 and the second switch signal SWS2 in an activated state may be equal to or higher than the detection voltage VD.

The feedback capacitor 225 may be coupled between the negative input electrode of the amplifier 224 and the output electrode of the amplifier 224.

The third switch 223 may be coupled between the negative input electrode of the amplifier 224 and the output electrode of the amplifier 224. That is, the feedback capacitor 225 and the third switch 223 may be coupled in parallel between the negative input electrode of the amplifier 224 and the output electrode of the amplifier 224. The third switch 223 may be turned on in response to the first switch signal SWS1 provided by the controller 300. When the third switch 223 is turned on, the feedback capacitor 225 may be reset.

The selection switch 226 may be coupled between the output electrode of the amplifier 224 and the corresponding column line COLk and COL(k+1). The selection switch 226 may be turned on in response to the selection control signal SEL provided by the controller 300. When the selection switch 226 is turned on, the analog signal AS1 and AS2 output through the output electrode of the amplifier 224 may be provided to the correlated double sampling and integration circuit 400 through the corresponding column line COLk and COL(k+1). On the other hand, when the selection switch 226 is turned off, the signal generation circuit 220 may be disconnected from the corresponding column line COLk and COL(k+1).

The multiple connection switch 227 may be coupled between the sensing electrode 210 included in the corresponding unit pixel 200 and the sensing electrode 210 included in at least one unit pixel 200 adjacent to the corresponding unit pixel 200 in a column direction. The multiple connection switch 227 may be turned on in response to the multiple connection control signal MCCS. Therefore, when the multiple connection switch 227 is turned on, the sensing electrode 210 included in the corresponding unit pixel 200 and the sensing electrode 210 included in the at least one unit pixel 200 adjacent to the corresponding unit pixel 200 in a column direction may be electrically connected.

In FIG. 3, the multiple connection switch 227 is illustrated to be coupled between the sensing electrode 210 included in the corresponding unit pixel 200 and the sensing electrode 210 included in one unit pixel 200, which is adjacent to the corresponding unit pixel 200 in a column direction and is included in a previous row. However, other embodiments are not limited thereto. In some embodiments, the multiple connection switch 227 may be coupled between the sensing electrode 210 included in the corresponding unit pixel 200 and the sensing electrode 210 included in one unit pixel 200, which is adjacent to the corresponding unit pixel 200 in a column direction and is included in a next row. In other embodiments, the multiple connection switch 227 may be coupled between the sensing electrode 210 included in the corresponding unit pixel 200 and the sensing electrode 210 included in one unit pixel 200, which is adjacent to the corresponding unit pixel 200 in a column direction and is included in a previous row and between the sensing electrode 210 included in the corresponding unit pixel 200 and the sensing electrode 210 included in one unit pixel 200, which is adjacent to the corresponding unit pixel 200 in a column direction and is included in a next row. Accordingly, any number of sensing electrodes 210 in a column may be electrically connected through associated multiple connection switches 227.

In some embodiments, the first switch 221, the second switch 222, the third switch 223, the selection switch 226, and the multiple connection switch 227 may include a MOS (Metal Oxide Semiconductor) transistor. However, in other embodiments, the first switch 221, the second switch 222, the third switch 223, the selection switch 226, and the multiple connection switch 227 may take different forms. Moreover, the first switch 221, the second switch 222, the third switch 223, the selection switch 226, and the multiple connection switch 227 may, but need not have the same form.

Although a particular signal generation circuit 220 is illustrated as an example, in other embodiments, different configurations may be used. For example, a signal generation circuit 220 including any amplifier circuit configured to generate a signal that varies based on the detection capacitor D_C may be used.

Hereinafter, an operation of the fingerprint sensor 10 will be described with reference to FIGS. 1 to 3. When a finger contacts on the pixel array 100, the controller 300 may determine one of the rows included in the pixel array 100 as a selected row, and determine at least one row adjacent to the selected row as an assistant row.

In some example embodiments, the controller 300 may determine a row, which includes the unit pixel 200 coupled to the multiple connection switch 227 included in the unit pixel 200 of the selected row, as the assistant row.

For example, as illustrated in FIG. 3, when the multiple connection switch 227 is coupled between the sensing electrode 210 included in the corresponding unit pixel 200 and the sensing electrode 210 included in one unit pixel 200, which is adjacent to the corresponding unit pixel 200 in a column direction and is included in a previous row, the controller 300 may determine one row adjacent to the selected row in a first direction, that is the previous row of the selected row, as the assistant row.

The controller 300 may provide the multiple connection control signal MCCS in a deactivated state, the selection control signal SEL in the deactivated state, the first switch signal SWS1 in the deactivated state, and the second switch signal SWS2 in the deactivated state to each of the unit pixels 200 included in rest of the rows except for the selected row. Therefore, the multiple connection switch 227, the selection switch 226, the first switch 221, the second switch 222, and the third switch 223 included in each of the unit pixels 200 included in the rest of the rows except for the selected row may be turned off. Therefore, referring to FIG. 3, the signal generation circuit 220 included in each of the unit pixels 200 included in the rest of the rows except for the selected row may be disconnected from the corresponding column line COLk and COL(k+1).

The controller 300 may provide the multiple connection control signal MCCS in the activated state and the selection control signal SEL in the activated state to a selected unit pixel included in the selected row.

Since the multiple connection switch 227 included in the selected unit pixel is turned on in response to the multiple connection control signal MCCS in the activated state, the sensing electrode 210 included in the selected unit pixel 200 and the sensing electrode 210 included in an assistant unit pixel 200, which is adjacent to the selected unit pixel 200 in a column direction and is included in the assistant row, may be electrically connected to each other through the multiple connection switch 227.

In addition, since the selection switch 226 included in the selected unit pixel is turned on in response to the selection control signal SEL in the activated state, the output electrode of the amplifier 224 included in the selected unit pixel may be coupled to the corresponding column line COLk and COL(k+1) through the selection switch 226.

Figure 4:
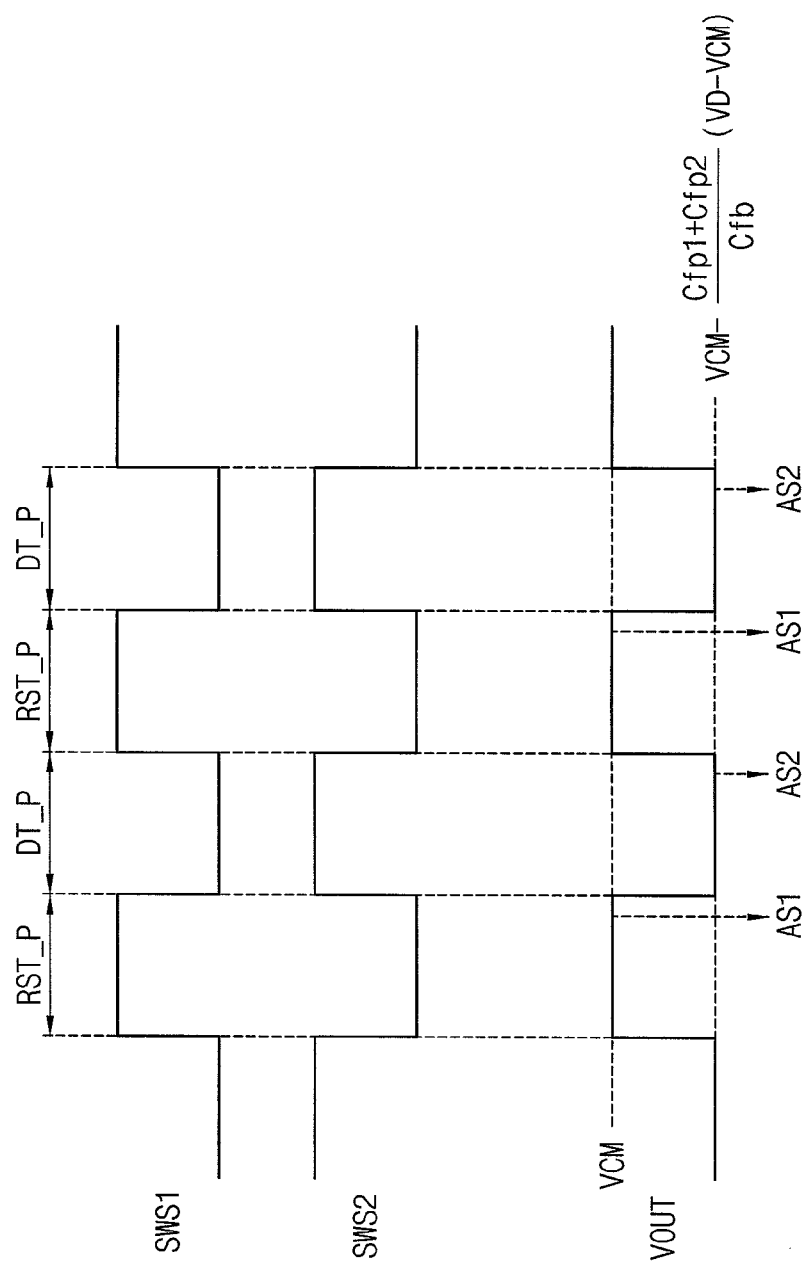
FIG. 4 is a timing diagram for describing an operation of a selected unit pixel included in a selected row.

FIG. 4 is a timing diagram for describing an operation of a selected unit pixel included in a selected row. As illustrated in FIG. 4, a reset period RST_P and a detection period DT_P may be alternated multiple times while one of the rows included in the pixel array 100 is determined as the selected row. The first switch signal SWS1 and the second switch signal SWS2 may alternate between the active state and the deactivated state. Further details will be given below in connection with FIGS. 5 and 6.

Figure 5:
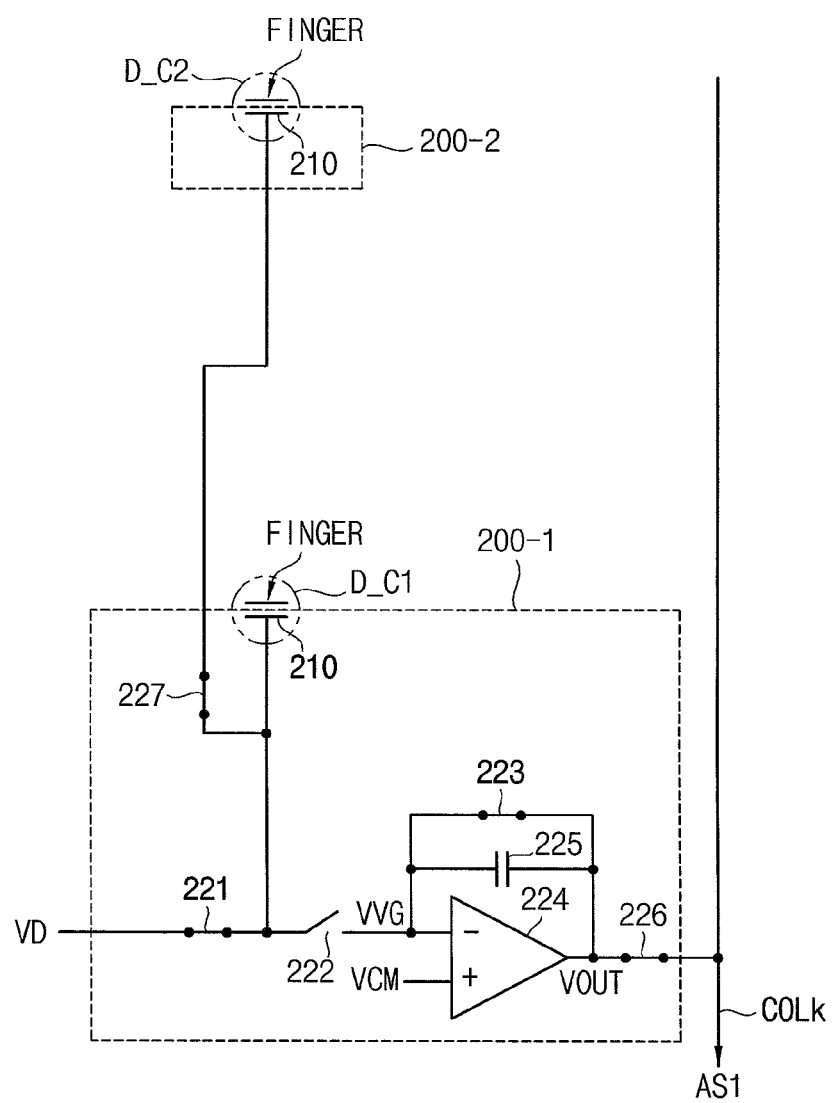
FIG. 5 is a circuit diagram illustrating a state of a selected unit pixel included in a selected row and an assistant unit pixel included in an assistant row during a reset period.
Figure 6:
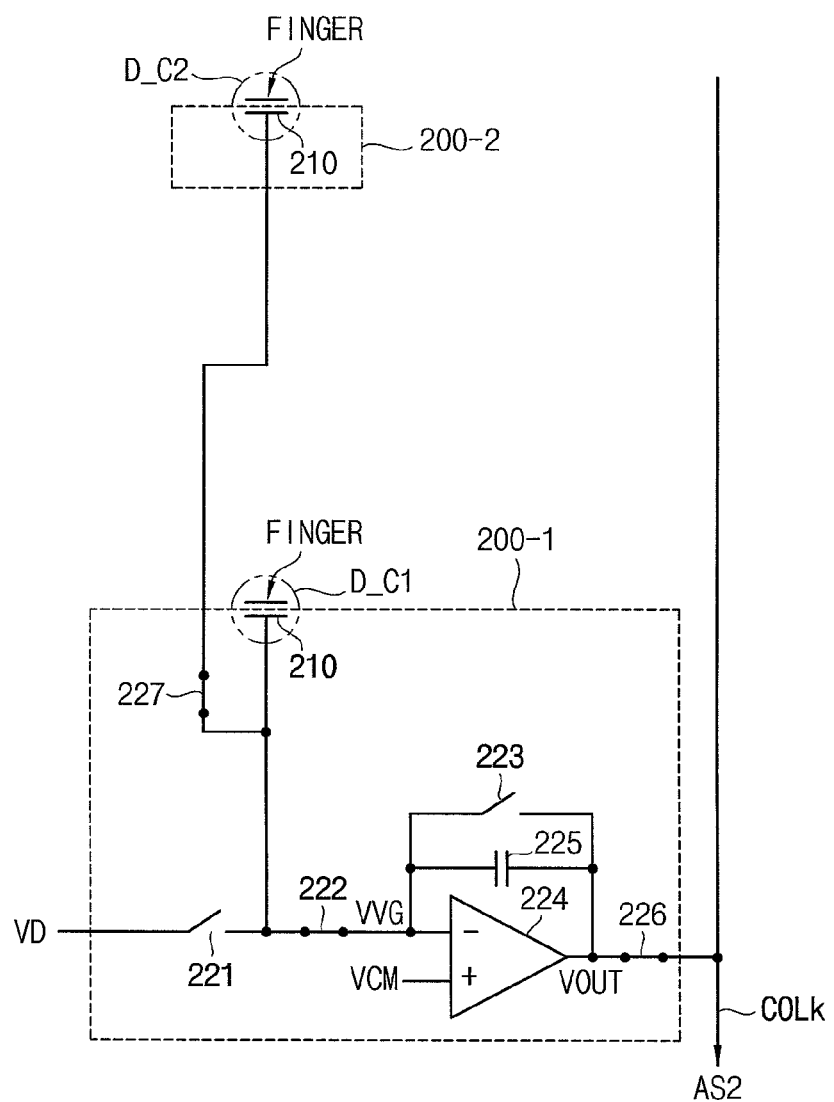
FIG. 6 is a circuit diagram illustrating a state of a selected unit pixel included in a selected row and an assistant unit pixel included in an assistant row during a detection period.

FIG. 5 is a circuit diagram illustrating a state of a selected unit pixel included in a selected row and an assistant unit pixel included in an assistant row during a reset period, and FIG. 6 is a circuit diagram illustrating a state of a selected unit pixel included in a selected row and an assistant unit pixel included in an assistant row during a detection period.

Referring to FIGS. 4 and 5, since the controller 300 provides the multiple connection control signal MCCS in the activated state and the selection control signal SEL in the activated state to the selected unit pixel 200-1 included in the selected row, as illustrated in FIGS. 5 and 6, the multiple connection switch 227 and the selection switch 226 included in the selected unit pixel 200-1 may be turned on.

On the other hand, since the controller 300 provides the multiple connection control signal MCCS in the deactivated state and the selection control signal SEL in the deactivated state to the assistant unit pixel 200-2 included in the assistant row, the signal generation circuit 220 included in the assistant unit pixel 200-2 may be disconnected from the corresponding column line COLk.

After that, as illustrated in FIG. 4, the controller 300 may provide the first switch signal SWS1 in the activated state and the second switch signal SWS2 in the deactivated state to the selected unit pixel 200-1 during the reset period RST_P. Therefore, as illustrated in FIG. 5, the first switch 221 and the third switch 223 included in the selected unit pixel 200-1 may be turned on during the reset period RST_P, and the second switch 222 included in the selected unit pixel 200-1 may be turned off during the reset period RST_P.

Since the first switch 221 and the multiple connection switch 227 are turned on, the detection voltage VD provided by the controller 300 may be applied to the sensing electrode 210 included in the selected unit pixel 200-1 and the sensing electrode 210 included in the assistant unit pixel 200-2. Therefore, the detection capacitor D_C1 formed by the sensing electrode 210 included in the selected unit pixel 200-1 and the finger and the detection capacitor D_C2 formed by the sensing electrode 210 included in the assistant unit pixel 200-2 and the finger may be charged by the detection voltage VD.

Since the third switch 223 is turned on, the feedback capacitor 225 may be reset. In addition, since the common voltage VCM is applied to the positive input electrode of the amplifier 224, a voltage VVG of the negative input electrode of the amplifier 224 may be substantially the same as the common voltage VCM. Therefore, a voltage VOUT of the output electrode of the amplifier 224 may correspond to the common voltage VCM.

As a result, the selected unit pixel 200-1 may output the common voltage VCM through the column line COLk as a first analog signal AS1 during the reset period RST_P.

Referring to FIGS. 4 and 6, afterwards, the controller 300 may provide the first switch signal SWS1 in the deactivated state and the second switch signal SWS2 in the activated state to the selected unit pixel 200-1 during the detection period DT_P. Therefore, as illustrated in FIG. 6, the first switch 221 and the third switch 223 included in the selected unit pixel 200-1 may be turned off during the detection period DT_P, and the second switch 222 included in the selected unit pixel 200-1 may be turned on during the detection period DT_P.

Therefore, charges stored in the detection capacitor D_C1 formed by the sensing electrode 210 included in the selected unit pixel 200-1 and the finger and the detection capacitor D_C2 formed by the sensing electrode 210 included in the assistant unit pixel 200-2 and the finger may be dispersed to the feedback capacitor 225.

Therefore, the voltage VOUT of the output electrode of the amplifier 224 in the detection period DT_P may be represented as Equation 1.

$$VOUT = VCM - ((Cfp1 + Cfp2)/(Cfb))*(VD - VCM) \quad (1)$$

Here, Cfp1 represents a capacitance of the detection capacitor D_C1 formed by the sensing electrode 210 included in the selected unit pixel 200-1 and the finger, Cfp2 represents a capacitance of the detection capacitor D_C2 formed by the sensing electrode 210 included in the assistant unit pixel 200-2 and the finger, and Cfb represents a capacitance of the feedback capacitor 225.

Therefore, the selected unit pixel 200-1 may output the voltage VOUT of the output electrode of the amplifier 224 represented in Equation 1 through the column line COLk as a second analog signal AS2 during the detection period DT_P.

As represented in Equation 1, the second analog signal AS2 output from the selected unit pixel 200-1 during the detection period DT_P may have a magnitude proportional to a sum of a capacitance Cfp1 of the detection capacitor D_C1 formed by the sensing electrode 210 included in the selected unit pixel 200-1 and the finger and a capacitance Cfp2 of the detection capacitor D_C2 formed by the sensing electrode 210 included in the assistant unit pixel 200-2 and the finger.

As illustrated in FIG. 4, since the controller 300 alternates the reset period RST_P and the detection period DT_P multiple times while one of the rows included in the pixel array 100 is determined as the selected row, the selected unit pixel 200-1 may alternately output the first analog signal AS1 and the second analog signal AS2 multiple times for the same selected unit pixel 200-1.

After that, the controller 300 may consecutively select each of the rows included in the pixel array 100 by moving in a unit of a row to determine the selected row.

In some embodiments, the pixel array 100 may include at least one dummy row and multiple normal rows, and the controller 300 may consecutively select each of the normal rows by moving in a unit of a row to determine the selected row.

The controller 300 may repeatedly perform the operation described above with reference to FIGS. 4 to 6 on consecutive rows, such that the pixel array 100 may output the first analog signal AS1 and the second analog signal AS2 row by row.

Figure 7:
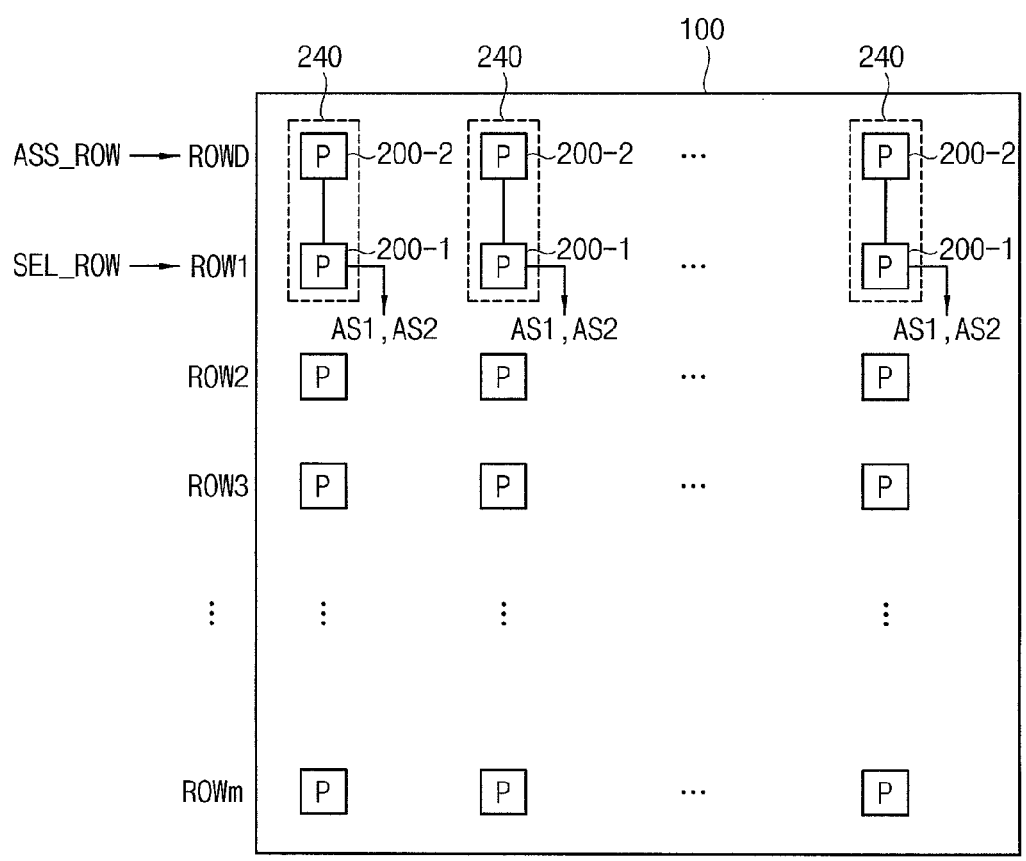
FIGS. 7 to 9 are diagrams for describing a process for a controller to determine one of rows included in a pixel array as a selected row.
Figure 8:
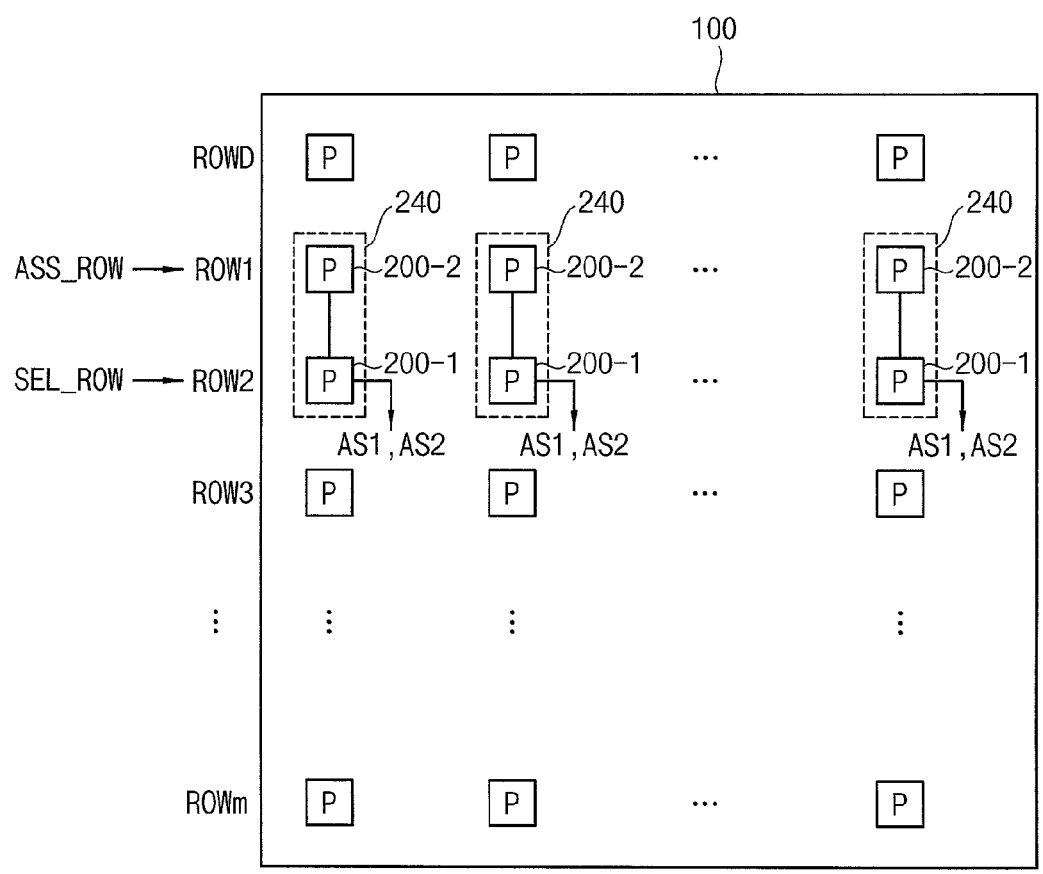
Figure 9:
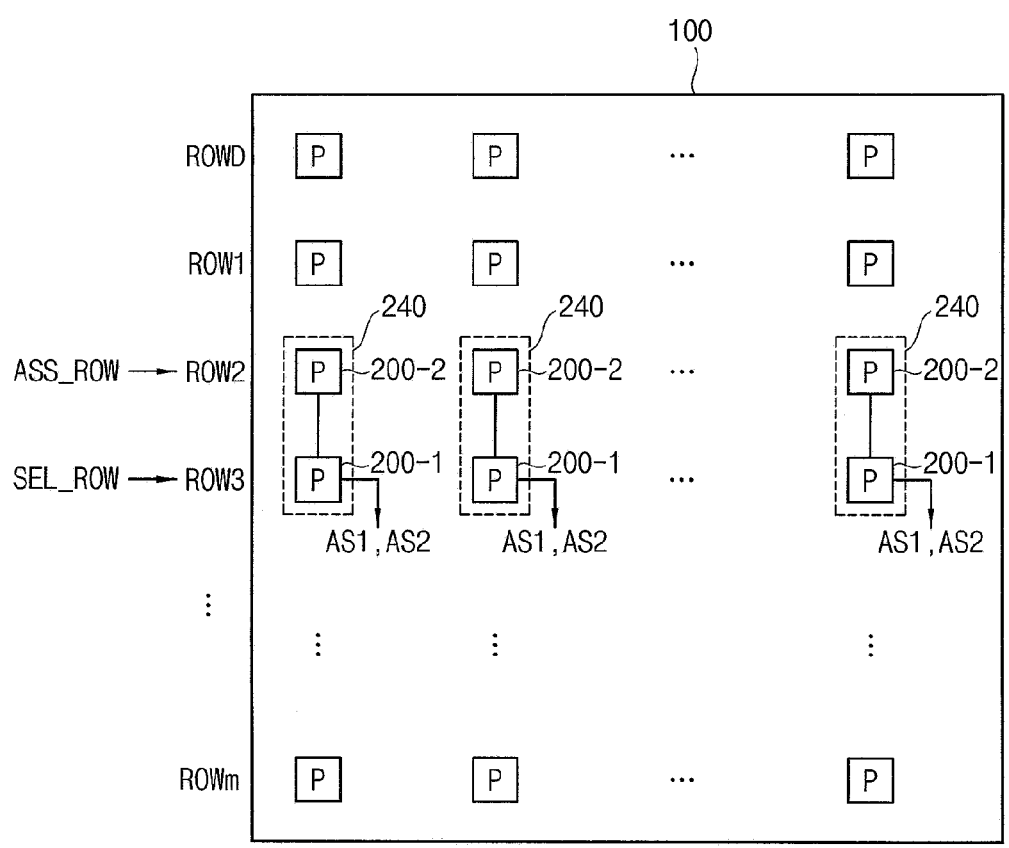

FIGS. 7 to 9 are diagrams for describing a process for a controller to determine one of rows included in a pixel array as a selected row. In FIGS. 7 to 9, an operation of the controller 300 is illustrated as an example when the multiple connection switch 227 is coupled between the sensing electrode 210 included in the unit pixel 200 of itself and the sensing electrode 210 included in one unit pixel 200, which is adjacent to the unit pixel 200 of itself in a column direction and is included in a previous row.

As illustrated in FIGS. 7 to 9, the pixel array 100 may include one dummy row ROWD on a top of the pixel array 100 and multiple normal rows ROW1, ROW2, ROW3, . . . , ROWm below the one dummy row ROWD. Here, m represents a positive integer. Although the dummy row ROWD is illustrated as being on a particular side of the pixel array 100, the dummy row ROWD may be disposed on an opposite side of the pixel array 100.

As illustrated in FIG. 7, the controller 300 may determine a first normal row ROW1 as the selected row SEL_ROW. In this case, the dummy row ROWD, which corresponds to a previous row of the first normal row ROW1, may be determined as the assistant row ASS_ROW.

As described above, since the controller 300 provides the multiple connection control signal MCCS in the activated state and the selection control signal SEL in the activated state to each of the selected unit pixels 200-1 included in the selected row SEL_ROW, the sensing electrode 210 included in the selected unit pixel 200-1 and the sensing electrode 210 included in the assistant unit pixel 200-2, which is adjacent to the selected unit pixel 200-1 in a column direction and is included in the assistant row ASS_ROW, may be electrically connected to each other through the multiple connection switch 227.

Therefore, the selected unit pixel 200-1 and the assistant unit pixel 200-2 that are adjacent to each other in a column direction may form a pixel group 240. The signal generation circuit 220 included in the selected unit pixel 200-1 may alternately output the first analog signal AS1, which corresponds to the common voltage VCM, and the second analog signal AS2, which has a magnitude proportional to a sum of capacitances of the detection capacitors D_C1 and D_C2 formed by the pixel group 240 and the finger.

Afterwards, as illustrated in FIG. 8, the controller 300 may determine a second normal row ROW2 as the selected row SEL_ROW. In this case, the first normal row ROW1, which corresponds to a previous row relative to the second normal row ROW2, may be determined as the assistant row ASS_ROW.

The controller 300 may perform the same operation described above on the selected unit pixels 200-1 included in the selected row SEL_ROW. Therefore, the signal generation circuit 220 included in the selected unit pixel 200-1 may alternately output the first analog signal AS1, which corresponds to the common voltage VCM, and the second analog signal AS2, which has a magnitude proportional to a sum of capacitances of the detection capacitors D_C1 and D_C2 formed by the pixel group 240 and the finger.

After that, as illustrated in FIG. 9, the controller 300 may determine a third normal row ROW3 as the selected row SEL_ROW. In this case, the second normal row ROW2, which corresponds to a previous row relative to the third normal row ROW3, may be determined as the assistant row ASS_ROW.

The controller 300 may perform the same operation described above on the selected unit pixels 200-1 included in the selected row SEL_ROW. Therefore, the signal generation circuit 220 included in the selected unit pixel 200-1 may alternately output the first analog signal AS1, which corresponds to the common voltage VCM, and the second analog signal AS2, which has a magnitude proportional to a sum of capacitances of the detection capacitors D_C1 and D_C2 formed by the pixel group 240 and the finger.

As illustrated in FIGS. 7 to 9, when the multiple connection switch 227 is coupled between the sensing electrode 210 included in the corresponding unit pixel 200 and the sensing electrode 210 included in one unit pixel 200, which is adjacent to the corresponding unit pixel 200 in a column direction and is included in a previous row, the one dummy row ROWD may be located on a top of the pixel array 100, and the controller 300 may determine the selected row SEL_ROW of a current cycle as the assistant row ASS_ROW in a next cycle.

On the other hand, when the multiple connection switch 227 is coupled between the sensing electrode 210 included in the corresponding unit pixel 200 and the sensing electrode 210 included in one unit pixel 200, which is adjacent to the corresponding unit pixel 200 in a column direction and is included in a next row, the one dummy row ROWD may be located on a bottom of the pixel array 100, and the controller 300 may determine the assistant row ASS_ROW of a current cycle as the selected row SEL_ROW in a next cycle.

As described above with reference to FIGS. 7 to 9, the controller 300 may consecutively select each of the normal rows ROW1, ROW2, ROW3, . . . , ROWm row by row as the selected row SEL_ROW, and the signal generation circuit 220 included in the selected row SEL_ROW may alternately output the first analog signal AS1, which corresponds to the common voltage VCM, and the second analog signal AS2, which has a magnitude proportional to a sum of capacitances of the detection capacitors D_C1 and D_C2 formed by the pixel group 240 and the finger.

In some embodiments, a length of each of the unit pixels 200 in a row direction and a length of each of the unit pixels 200 in a column direction may be smaller than 50 micro meters.

Generally, a distance between ridges of a fingerprint of a person and a distance between valleys of a fingerprint of a person may be 150-300 micro meters. Therefore, although the fingerprint sensor 10 according to example embodiments generates the second analog signal AS2 based on a sum of capacitances of the detection capacitors D_C1 and D_C2 formed by two unit pixels 200 adjacent to each other in a column direction, a fingerprint recognition performance of the fingerprint sensor 10 may not be degraded.

Referring again to FIG. 1, the correlated double sampling and integration circuit 400 may receive the first analog signal AS1 and the second analog signal AS2 output by the pixel array 100 row by row, and operate based on a first control signal CON1 provided by the controller 300.

As described above, since the pixel array 100 alternately outputs the first analog signal AS1 and the second analog signal AS2 multiple times for the selected row SEL_ROW, the correlated double sampling and integration circuit 400 may be configured to obtain a difference between the first analog signal AS1 and the second analog signal AS2 by performing a correlated double sampling operation on the first analog signal AS1 and the second analog signal AS2, and generate an integration signal INTS by performing an integration operation on the difference between the first analog signal AS1 and the second analog signal AS2.

Since the first analog signal AS1 corresponds to the common voltage VCM and the second analog signal AS2 is represented as Equation 1, the difference between the first analog signal AS1 and the second analog signal AS2 may be represented as Equation 2.

$$AS1-AS2=((Cfp1+Cfp2)/(Cfb))*(VD-VCM) \qquad (2)$$

As represented in Equation 2, the difference between the first analog signal AS1 and the second analog signal AS2 may have a magnitude proportional to the sum of the capacitance Cfp1 of the detection capacitor D_C1 formed by the sensing electrode 210 included in the selected unit pixel 200-1 and the finger and the capacitance Cfp2 of the detection capacitor D_C2 formed by the sensing electrode 210 included in the assistant unit pixel 200-2 and the finger. Therefore, the integration signal INTS generated by the correlated double sampling and integration circuit 400 may have a magnitude proportional to the sum of the capacitance Cfp1 of the detection capacitor D_C1 formed by the sensing electrode 210 included in the selected unit pixel 200-1 and the finger and the capacitance Cfp2 of the detection capacitor D_C2 formed by the sensing electrode 210 included in the assistant unit pixel 200-2 and the finger.

The sample and hold circuit 500 may be configured to sample the integration signal INTS based on a hold signal HS provided by the controller 300, and output the sampled signal as a sampling signal SAMS.

The analog-to-digital converter 600 may be configured to perform an analog-to-digital conversion operation on the sampling signal SAMS based on a second control signal CON2 provided by the controller 300 to generate a digital signal DS.

Therefore, the digital signal DS may represent a fingerprint pattern of the finger contacted on the pixel array 100.

A general fingerprint sensor may obtain a fingerprint image of a finger based on a capacitance between the finger and a sensing electrode included in a pixel on which a ridge of a fingerprint is located and a capacitance between the finger and a sensing electrode included in a pixel on which a valley of the fingerprint is located. Therefore, a size of a pixel included in the fingerprint sensor may be reduced to increase a resolution of the fingerprint sensor. However, when a size of a pixel is reduced, a size of the sensing electrode included in the pixel may also be reduced, such that a capacitance between the sensing electrode and a finger decreases. Therefore, when the size of a pixel is reduced, a sensing performance of the fingerprint sensor may decrease.

On the other hand, in the fingerprint sensor 10 according to various embodiments, when a finger contacts on the pixel array 100, the controller 300 may electrically connect the sensing electrodes 210, which are included in at least two unit pixels 200 adjacent to each other in a column direction, turn on one of the signal generation circuits 220 included in the at least two unit pixels 200, and turn off rest of the signal generation circuits 220 included in the at least two unit pixels 200. Therefore, the turned-on signal generation circuit 220 among the signal generation circuits 220 included in the at least two unit pixels 200 may be configured to generate the second analog signal AS2 having a magnitude proportional to a sum of capacitances of the detection capacitors D_C1 and D_C2 formed by the sensing electrodes 210 included in the at least two unit pixels 200.

Therefore, the magnitude of the second analog signal AS2 generated by the pixel array 100 included in the fingerprint sensor 10 may be about two times of a magnitude of an analog signal generated by a pixel array included in the general fingerprint sensor. As such, a sensing performance of the fingerprint sensor 10 may be effectively increased.

In addition, as described above, although the fingerprint sensor 10 according to some embodiments generates the second analog signal AS2 using the sensing electrodes 210 included in at least two unit pixels 200 adjacent to each other in a column direction, a resolution of the fingerprint sensor 10 may not be degraded since the controller 300 consecutively selects each of the normal rows ROW1, ROW2, ROW3, . . . , ROWm by moving in a unit of a row to determine the selected row SEL_ROW.

In addition, since the fingerprint sensor 10 consecutively selects each of the normal rows ROW1, ROW2, ROW3, . . . , ROWm by moving in a unit of a row to determine the selected row SEL_ROW and generates the second analog signal AS2 using the sensing electrodes 210 included in at least two unit pixels 200 included in the selected row SEL_ROW and the assistant row ASS_ROW, the fingerprint sensor 10 may effectively reduce a recognition error caused by a mismatch among sizes of the sensing electrodes 210 included in the unit pixels 200.

Figure 10:
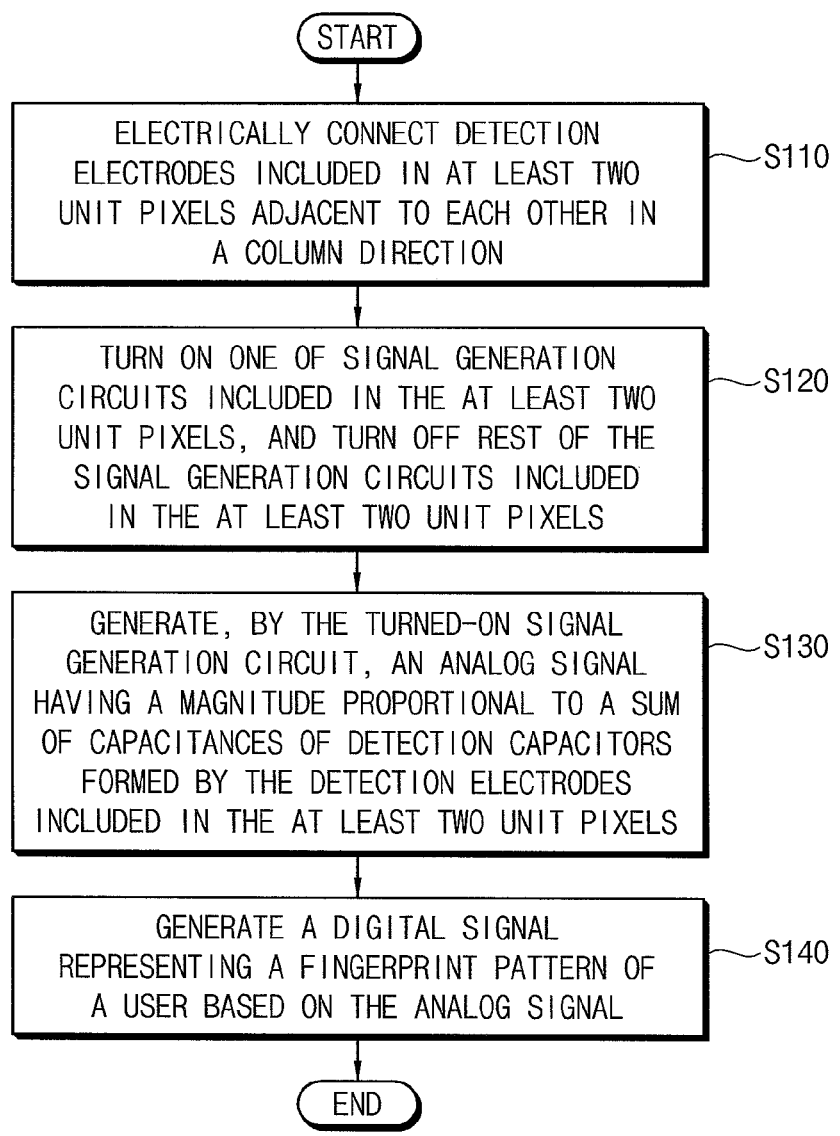
FIG. 10 is a flow chart illustrating a method of operating a fingerprint sensor according to some embodiments.

FIG. 10 is a flow chart illustrating a method of operating a fingerprint sensor according to example embodiments.

The method of operating a fingerprint sensor of FIG. 10 may be performed by the fingerprint sensor 10 of FIG. 1.

Hereinafter, a method of operating the fingerprint sensor 10 will be described with reference to FIGS. 1 to 10. Referring to FIG. 10, when a finger contacts on the pixel array 100, the fingerprint sensor 10 may electrically connect the sensing electrodes 210, which are included in at least two unit pixels 200 adjacent to each other in a column direction (step S110), turn on one of the signal generation circuits 220 included in the at least two unit pixels 200, and turn off rest of the signal generation circuits 220 included in the at least two unit pixels 200 (step S120).

The turned-on signal generation circuit 220 of the fingerprint sensor 10 may alternately output the first analog signal AS1, which corresponds to the common voltage VCM, and the second analog signal AS2, which has a magnitude proportional to a sum of capacitances of the detection capacitors D_C1 and D_C2 formed by the sensing electrodes 210 included in the at least two unit pixels 200 (step S130).

After that, the fingerprint sensor 10 may generate the digital signal DS representing a fingerprint pattern of the finger contacted on the pixel array 100 based on the difference between the first analog signal AS1 and the second analog signal AS2 (step S140).

For example, the correlated double sampling and integration circuit 400 of the fingerprint sensor 10 may obtain the difference between the first analog signal AS1 and the second analog signal AS2 by performing a correlated double sampling operation on the first analog signal AS1 and the second analog signal AS2 received from the pixel array 100 row by row, and generate the integration signal INTS by performing an integration operation on the difference between the first analog signal AS1 and the second analog signal AS2.

After that, the sample and hold circuit 500 of the fingerprint sensor 10 may sample the integration signal INTS and output the sampled signal as the sampling signal SAMS. The analog-to-digital converter 600 of the fingerprint sensor 10 may perform an analog-to-digital conversion operation on the sampling signal SAMS to generate the digital signal DS.

A structure and an operation of the fingerprint sensor 10 are described above with reference to FIGS. 1 to 9. Therefore, a detailed description of the steps of FIG. 10 will be omitted.

Figure 11:
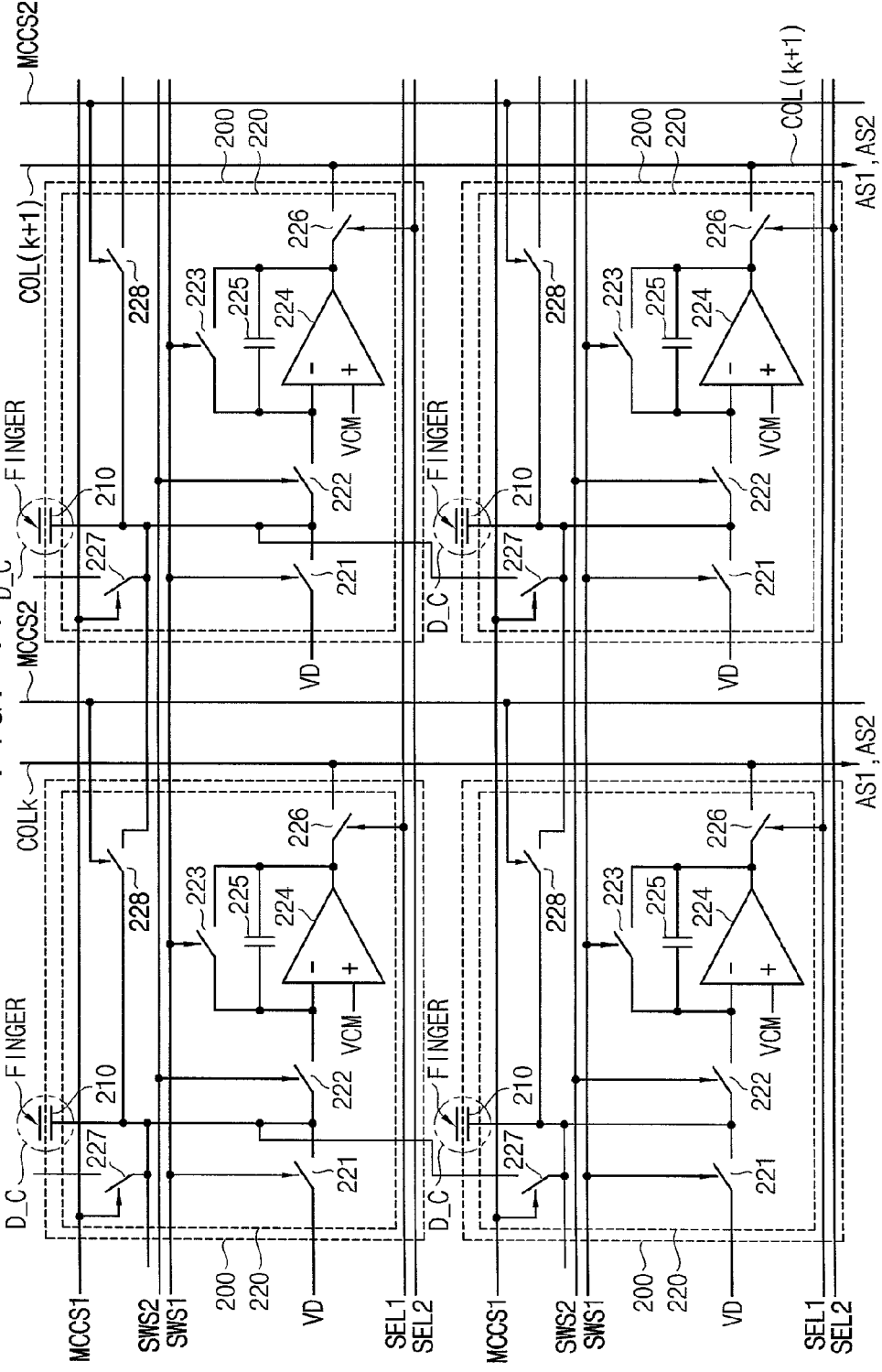
FIG. 11 is a circuit diagram illustrating an example of a pixel array according to some embodiments.

FIG. 11 is a circuit diagram illustrating an example of a pixel array according to some embodiments. The pixel array of FIG. 11 is similar to the pixel array of FIG. 3. Detailed description of the similar components will be omitted. In some embodiments, each unit pixel 200 includes a second multiple connection switch 228. While the multiple connection switch 227 is configured to electrically connect sensing electrodes 210 of unit pixels 200 in adjacent rows, the multiple connection switch 228 is configured to electrically connect sensing electrodes 210 of unit pixels 200 in adjacent columns. Accordingly, the multiple connection switch 228 allows adjacent sensing electrodes 210 of unit pixels 200 in adjacent columns to be combined similar to the adjacent sensing electrodes 210 of unit pixels 200 in adjacent rows as described above. In addition, the combination of the multiple connection switch 227 and the multiple connection switch 228 allows adjacent sensing electrodes 210 of unit pixels 200 in adjacent rows and columns to be electrically connected together.

The multiple connection switches 228 are responsive to a second multiple connection control signal MCCS2. For clarity, the multiple connection control signal MCCS similar to FIG. 3 is referred to as the multiple connection control signal MCCS1.

In contrast to FIG. 3, in some embodiments, two selection control signals SEL1 and SEL2 are coupled to the unit pixels 200. The selection control signals SEL1 and SEL2 are used to control the selection switches 226 of the unit pixels 200 similar to the selection control signal SEL of FIG. 3. However, the selection control signals SEL1 and SEL2 are connected to alternate unit pixels 200 in the row direction. Accordingly, the selection control signals SEL1 and SEL2 may be used to select which signal generation circuit 220 is connected to the column line COL.

FIGS. 12A to 13D are diagrams for describing a process for a controller to operate the pixel array of FIG. 11. Referring to FIGS. 11 and 12A, in some embodiments, for unit pixels 200 of rows ROW1 and ROW2, alternate multiple connection control signals MCCS2 are activated. As a result, alternate multiple connection switches 228 are closed, coupling the sensing electrodes 210 in unit pixels 200-1 and 200-2 adjacent in the row direction of the pixel group 240-1 together. The multiple connection control signals MCCS is not activated and thus, the multiple connection switches 227 are not closed. As a result, the sensing electrodes 210 in unit pixels 200 adjacent in the column direction are not electrically connected.

For the unit pixels 200 of row ROW1, the selection control signal SEL1 is activated and the selection control signals SEL2 is deactivated. For the unit pixels 200 of row ROW2, the selection control signals SEL1 is deactivated and the selection control signals SEL2 is activated. Accordingly, the signal generation circuits 220 of alternating unit pixels 200 are coupled to the corresponding column line COL.

Referring to FIGS. 11 and 12B, after reading the first and second analog signals AS1 and AS2 as described above, the activation of the multiple connection control signals MCCS2 are switched so that sensing electrodes 210 of adjacent unit pixels 200 one unit pixel offset in the row direction are now electrically connected. In addition, the activation of the selection control signal SEL1 and the selection control signal SEL2 are switched. As a result, a different pixel group 240-1 may be sensed.

Referring to FIGS. 7, 12C, and 12D, the operations of FIGS. 12C and 12D may be similar to that of FIGS. 12A and 12B, respectively. However, the selection control signals SEL1 and SEL2, the switch signals SWS1 and SWS2, or the like are activated to sense pixel groups 240-1 in rows ROW3 and ROW4.

Figure 13A:
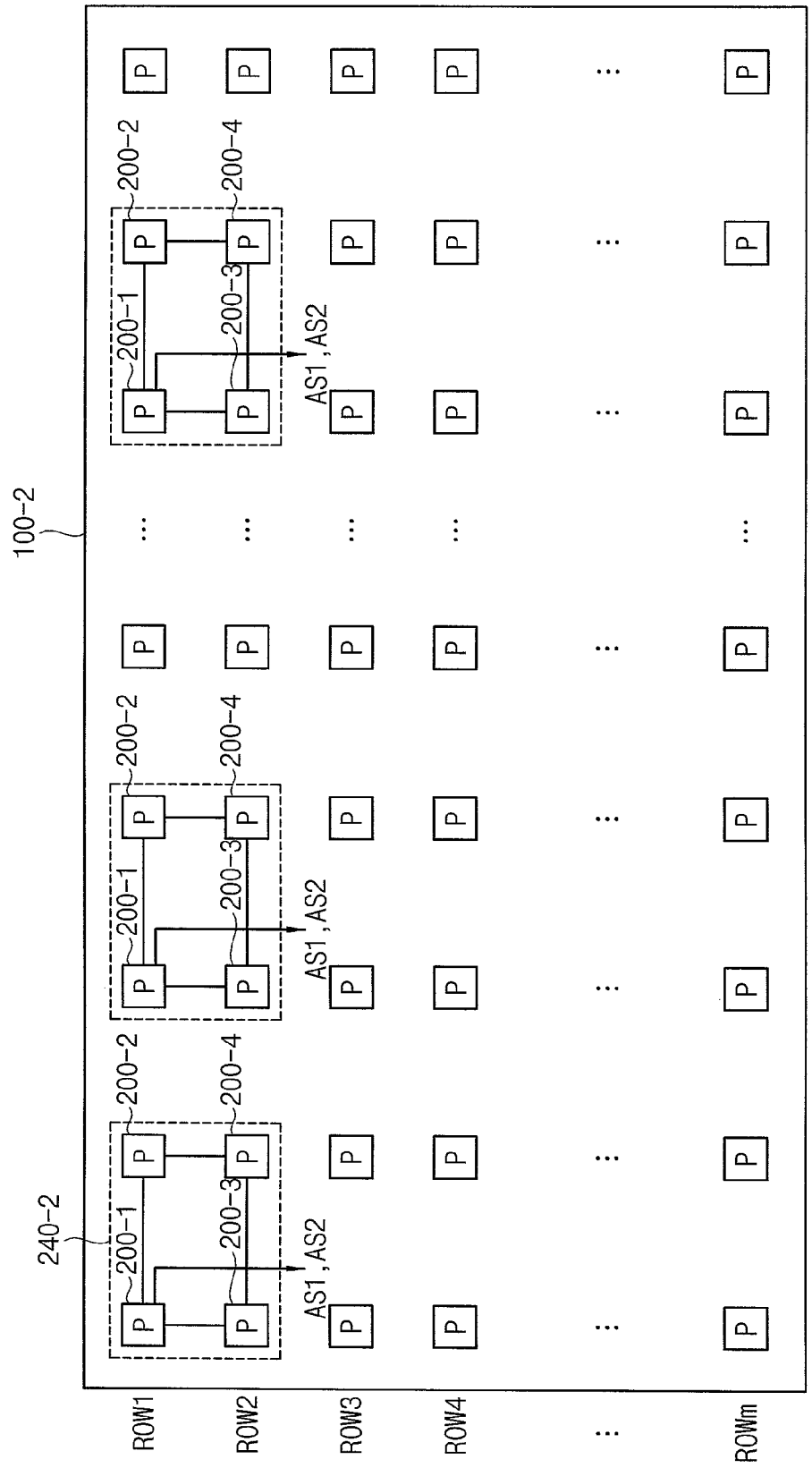

Referring to FIGS. 7 and 13A, the operations of FIG. 13A may be similar to that of FIG. 12A. However, the multiple connection control signals MCCS between rows ROW1 and ROW2 is activated, electrically connecting sensing electrodes 210 of unit pixels 200 adjacent in the column direction. Accordingly, four sensing electrodes 210 are electrically connected together for each pixel group 240-2 including unit pixels 200-1 to 200-4.

Referring to FIGS. 7 and 13B, the operations of FIG. 13B may be similar to that of FIG. 12B. However, the multiple connection control signals MCCS between rows ROW1 and ROW2 is activated similar to FIG. 13A.

Figure 13D:
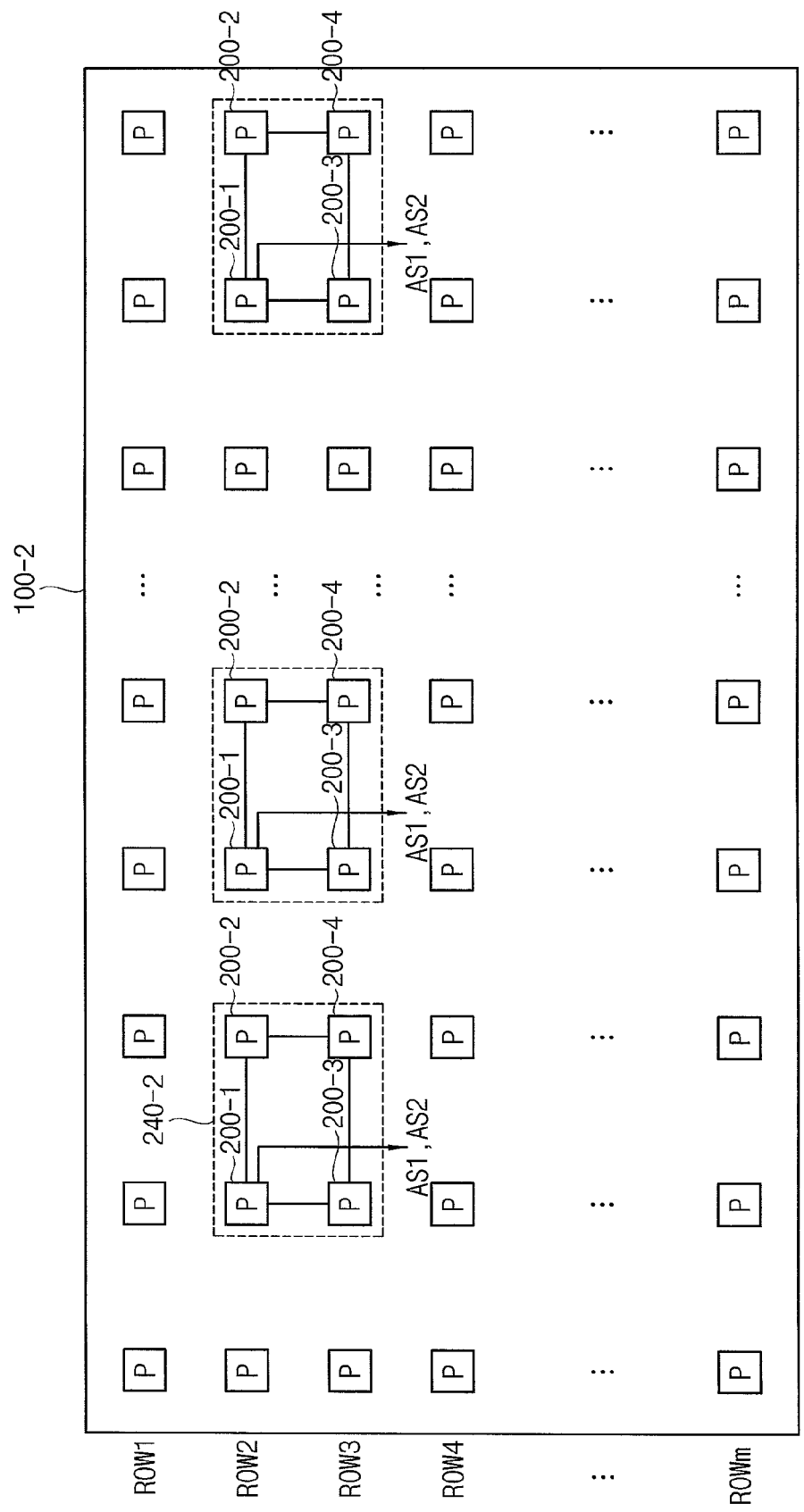

Referring to FIGS. 7, 13C, and 13D, the operations of FIGS. 13C and 13D may be similar to that of FIGS. 13A and 13B, respectively. However, the multiple connection control signals MCCS between rows ROW2 and ROW3 is activated, coupling the sensing electrodes 210 of unit pixels 200 adjacent in the column direction.

Although particular configurations of switches and control signals has been used as examples in FIGS. 3 and 11, in other embodiments, the configuration may be different depending on which sensing electrodes 210 are electrically connected and the particular technique of iterating over the rows and columns.

Some embodiments are directed to provide a fingerprint sensor that has an increased sensing performance while maintaining a high resolution.

Some embodiments are directed to provide an electronic device including the fingerprint sensor.

Some embodiments are directed to provide a method of operating the fingerprint sensor.

Some embodiments include a fingerprint sensor includes a pixel array and a controller. The pixel array includes multiple unit pixels arranged in rows and columns. Each of the unit pixels includes a sensing electrode configured to form a detection capacitor together with a finger, and a signal generation circuit configured to generate an analog signal based on a capacitance of the detection capacitor. The controller controls an operation of the pixel array. The controller electrically connects sensing electrodes, which are included in at least two unit pixels adjacent to each other in a column direction, turns on one of signal generation circuits included in the at least two unit pixels, and turns off rest of the signal generation circuits included in the at least two unit pixels. The turned-on signal generation circuit generates the analog signal having a magnitude proportional to a sum of capacitances of detection capacitors formed by the sensing electrodes included in the at least two unit pixels.

In some embodiments, the signal generation circuit may include a multiple connection switch, a first switch, an amplifier, a second switch, a feedback capacitor, a third switch, and a selection switch. The multiple connection switch may be coupled between the sensing electrode and a sensing electrode included in at least one unit pixel adjacent in a column direction. The multiple connection switch may turn on in response to a multiple connection control signal. The first switch may turn on in response to a first switch signal to provide a detection voltage to the sensing electrode. The amplifier may include a negative input electrode, a positive input electrode receiving a common voltage, and an output electrode. The second switch may be coupled between the negative input electrode of the amplifier and the sensing electrode. The second switch may turn on in response to a second switch signal. The feedback capacitor may be coupled between the negative input electrode of the amplifier and the output electrode of the amplifier. The third switch may be coupled between the negative input electrode of the amplifier and the output electrode of the amplifier. The third switch may turn on in response to the first switch signal. The selection switch may be coupled between the output electrode of the amplifier and a column line. The selection switch may turn on in response to a selection control signal.

The controller may provide the multiple connection control signal, the first switch signal, the second switch signal, and the selection control signal to the signal generation circuit.

The controller may determine one of the rows included in the pixel array as a selected row, and determine at least one row adjacent to the selected row as an assistant row. The controller may provide the multiple connection control signal in an activated state and the selection control signal in the activated state to a selected unit pixel included in the selected row, and provide the multiple connection control signal in a deactivated state and the selection control signal in the deactivated state to an assistant unit pixel included in the assistant row.

The controller may determine a row adjacent to the selected row in a first direction as the assistant row.

The controller may provide the first switch signal in the activated state and the second switch signal in the deactivated state to the selected unit pixel during a reset period, and provide the first switch signal in the deactivated state and the second switch signal in the activated state to the selected unit pixel during a detection period. The controller may provide the first switch signal in the deactivated state and the second switch signal in the deactivated state to the assistant unit pixel during the reset period and the detection period.

The selected unit pixel may output the common voltage through the column line as a first analog signal during the reset period, and output a voltage having a magnitude proportional to a sum of a capacitance of the detection capacitor formed by the sensing electrode of the selected unit pixel and a capacitance of the detection capacitor formed by the sensing electrode of the assistant unit pixel through the column line as a second analog signal during the detection period.

The reset period and the detection period may be alternated multiple times while one of the rows included in the pixel array is determined as the selected row.

The controller may consecutively select each of the rows included in the pixel array by moving in a unit of a row to determine the selected row.

The pixel array may include at least one dummy row and multiple normal rows.

The controller may consecutively select each of the normal rows by moving in a unit of a row to determine the selected row.

The controller may determine the assistant row of a current cycle as the selected row in a next cycle.

The controller may determine the selected row of a current cycle as the assistant row in a next cycle.

The amplifier may operate using a supply voltage, and the detection voltage may be higher than the supply voltage.

A voltage level of the first switch signal and the second switch signal in the activated state may be equal to or higher than the detection voltage.

In some embodiments, a length of each of the unit pixels in a row direction and a length of each of the unit pixels in a column direction may be smaller than 50 micro meters.

In some embodiments, the fingerprint sensor may further include a correlated double sampling and integration circuit configured to perform a correlated double sampling operation and an integration operation on the analog signal provided by the pixel array to generate an integration signal, a sample and hold circuit configured to sample the integration signal based on a hold signal to generate a sampling signal, and an analog-to-digital converter configured to perform an analog-to-digital conversion operation on the sampling signal to generate a digital signal.

Some embodiments include an electronic device including a fingerprint sensor and an application processor. The fingerprint sensor includes multiple unit pixels having a sensing electrode. The fingerprint sensor electrically connects sensing electrodes, which are included in at least two unit pixels adjacent to each other in a column direction, and generates a digital signal having a magnitude proportional to a sum of capacitances of detection capacitors formed by the sensing electrodes included in the at least two unit pixels and a user's finger. The application processor authenticates the user based on the digital signal.

In some embodiments, the fingerprint sensor may include a pixel array, an analog-to-digital converter, and a controller. The pixel array may include the unit pixels arranged in rows and columns. Each of the unit pixels may generate an analog signal corresponding to a fingerprint of the user. The analog-to-digital converter may generate the digital signal based on the analog signal. The controller may control operations of the pixel array and the analog-to-digital converter. Each of the unit pixels may further include a signal generation circuit generating the analog signal based on the capacitance of the detection capacitor formed by the sensing electrode and the user's finger. The controller may electrically connect the sensing electrodes, which are included in the at least two unit pixels adjacent to each other in a column direction, turn on one of signal generation circuits included in the at least two unit pixels, and turn off rest of the signal generation circuits included in the at least two unit pixels. The turned-on signal generation circuit may generate the analog signal having a magnitude proportional to the sum of capacitances of the detection capacitors formed by the sensing electrodes included in the at least two unit pixels.

The signal generation circuit may include a multiple connection switch, a first switch, an amplifier, a second switch, a feedback capacitor, a third switch, and a selection switch. The multiple connection switch may be coupled between the sensing electrode and a sensing electrode included in at least one unit pixel adjacent in a column direction. The multiple connection switch may turn on in response to a multiple connection control signal. The first switch may turn on in response to a first switch signal to provide a detection voltage to the sensing electrode. The amplifier may include a negative input electrode, a positive input electrode receiving a common voltage, and an output electrode. The second switch may be coupled between the negative input electrode of the amplifier and the sensing electrode. The second switch may turn on in response to a second switch signal. The feedback capacitor may be coupled between the negative input electrode of the amplifier and the output electrode of the amplifier. The third switch may be coupled between the negative input electrode of the amplifier and the output electrode of the amplifier. The third switch may turn on in response to the first switch signal. The selection switch may be coupled between the output electrode of the amplifier and a column line. The selection switch may turn on in response to a selection control signal.

In a method of operating a fingerprint sensor including multiple unit pixels arranged in rows and columns, where each of the unit pixels includes a sensing electrode and a signal generation circuit that generates an analog signal based on a capacitance of a detection capacitor formed by the sensing electrode and a user's finger, sensing electrodes included in at least two unit pixels adjacent to each other in a column direction are electrically connected, one of signal generation circuits included in the at least two unit pixels is turned on, rest of the signal generation circuits included in the at least two unit pixels is turned off, the analog signal having a magnitude proportional to a sum of capacitances of detection capacitors formed by the sensing electrodes included in the at least two unit pixels is generated by the turned-on signal generation circuit, and a digital signal representing a fingerprint pattern of the user is generated based on the analog signal.

Figure 14:
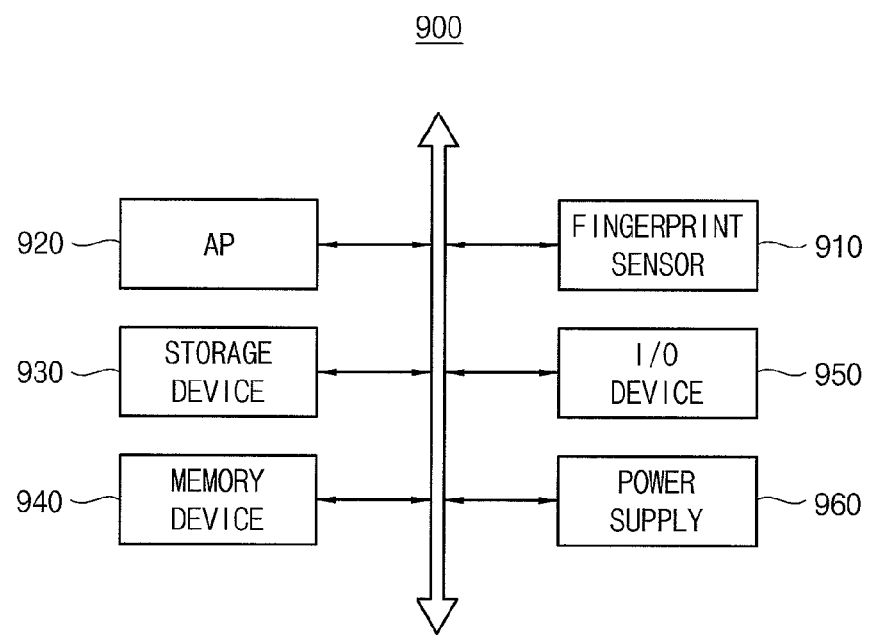
FIG. 14 is a block diagram illustrating an electronic device according to some embodiments.

FIG. 14 is a block diagram illustrating an electronic device according to an example embodiment. Referring to FIG. 14, an electronic device 900 includes a fingerprint sensor 910, an application processor AP 920, a storage device 930, a memory device 940, an input/output device 950, and a power supply 960. Although it is not illustrated in FIG. 14, the electronic device 900 may further include ports configured to communicate with a video card, a sound card, a memory card, a universal serial bus (USB) device, or other electronic devices.

The fingerprint sensor 910 may be configured to detect a fingerprint of a user and generates a digital signal representing the detected fingerprint. For example, the fingerprint sensor 910 may include multiple unit pixels having a sensing electrode. The fingerprint sensor 910 may be configured to electrically connect sensing electrodes, which are included in at least two unit pixels adjacent to each other in a column direction, and generate a digital signal having a magnitude proportional to a sum of capacitances of detection capacitors formed by the sensing electrodes included in the at least two unit pixels and a user's finger.

The fingerprint sensor 910 may be implemented as the fingerprint sensor 10 of FIG. 1. A structure and an operation of the fingerprint sensor 10 are described above with reference to FIGS. 1 to 10. Therefore, a detailed description of the fingerprint sensor 910 will be omitted.

The application processor 920 may be configured to control overall operations of the electronic device 900. The application processor 920 may be configured to execute applications, such as a web browser, a game application, a video player, etc. In some embodiments, the application processor 920 may include a single core or multiple cores. For example, the application processor 920 may be a multi-core processor, such as a dual-core processor, a quad-core processor, a hexa-core processor, etc. The application processor 920 may include an internal or external cache memory.

The storage device 930 may be configured to store a boot image for booting the electronic device 900. For example, the storage device 930 may include a nonvolatile memory device such as a flash memory device, a solid state drive (SSD), or the like.

The memory device 940 may store data required for an operation of the electronic device 900. For example, the memory device 940 may include a volatile memory device such as a dynamic random access memory (DRAM), a static random access memory (SRAM), or the like.

The input/output device 950 may include an input device such as a touch screen, a keypad, etc., and an output device such as a speaker, a display device, etc. The power supply 960 may be configured to supply operational power to the electronic device 900.

In some embodiments, the application processor 920 may be configured to authenticate the user based on the digital signal generated by the fingerprint sensor 910. For example, the storage device 930 may be configured to store digital data representing a fingerprint pattern of an allowed user of the electronic device 900. When the application processor 920 receives the digital signal representing a fingerprint pattern of a current user from the fingerprint sensor 910, the application processor 920 may compare the digital signal with the digital data stored in the storage device 930 to determine whether the current user is the allowed user.

In some embodiments, the electronic device 900 may be any of a variety of mobile devices, such as a mobile phone, a smart phone, a personal digital assistant (PDA), a portable multimedia player (PMP), a digital camera, a camcorder, a music player, a portable game console, a navigation system, a laptop computer, etc.

Figure 15:
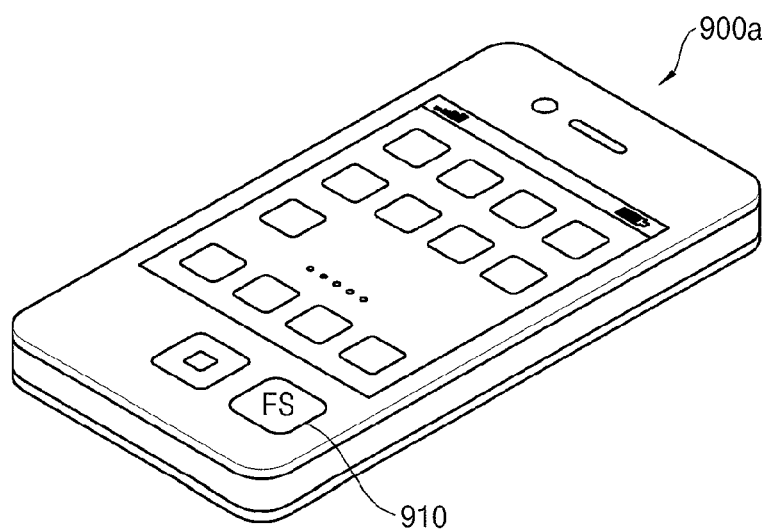
FIG. 15 is a diagram illustrating an example in which the electronic device of FIG. 14 is implemented as a smart phone.

FIG. 15 is a diagram illustrating an example in which the electronic device of FIG. 14 is implemented as a smart phone. Referring to FIGS. 14 and 15, the fingerprint sensor FS 910 included in a smart phone 900a may be configured to generate a digital signal representing a fingerprint pattern of a current user by performing operations described above with reference to FIGS. 1 to 10.

The application processor 920 may be configured to determine whether the current user is an allowed user based on whether the digital signal received from the fingerprint sensor 910 is the same as the digital data stored in the storage device 930.

Although the fingerprint sensor 910 is located at a bottom part of a front face of the smart phone 900a in FIG. 15, other embodiments are not limited thereto. According to some embodiments, the fingerprint sensor 910 may be located at any part of the smart phone 900a.

The foregoing is illustrative of the embodiments and is not to be construed as limiting thereof. Although a few particular embodiments have been described, those skilled in the art will readily appreciate that many modifications are possible to the particular embodiments without materially departing from the novel teachings and advantages. Accordingly, all such modifications are intended to be included within the scope as defined in the claims. Therefore, it is to be understood that the foregoing is illustrative of embodiments and is not to be construed as limited to the specific embodiments disclosed, and that modifications to the disclosed particular embodiments, as well as other embodiments, are intended to be included within the scope of the appended claims.

What is claimed is:

1. A fingerprint sensor, comprising:
a pixel array including a plurality of unit pixels arranged in rows and columns, wherein the pixel array includes at least one dummy row and a plurality of normal rows, and wherein each of the plurality of unit pixels includes:
a sensing electrode configured to form a detection capacitor; and
a signal generation circuit configured to generate an analog signal based on a capacitance of the detection capacitor; and
a controller configured to control an operation of the pixel array, wherein the controller is configured to:
determine one of the rows included in the plurality of normal rows as a selected row and at least one row adjacent to the selected row as an assistant row,
consecutively select each of the plurality of normal rows by moving in a unit of a row to determine the selected row, and
electrically connect sensing electrodes of at least two unit pixels adjacent to each other in the selected row and the assistant row, and activate only one of the signal generation circuits included in the at least two unit pixels to generate the analog signal.

2. The fingerprint sensor of claim 1, wherein the activated signal generation circuit is configured to generate the analog signal having a magnitude proportional to a sum of capacitances of detection capacitors including the sensing electrodes in the at least two unit pixels.

3. The fingerprint sensor of claim 1, wherein the at least two unit pixels adjacent to each other are adjacent in a column direction.

4. The fingerprint sensor of claim 1, wherein the at least two unit pixels adjacent to each other are adjacent in a row direction.

5. The fingerprint sensor of claim 1, wherein the signal generation circuit in a selected unit pixel in the selected row includes:
a multiple connection switch coupled between the sensing electrode of the selected unit pixel and the sensing electrode of an assistant unit pixel in the assistant row adjacent to the selected unit pixel in a column direction, the multiple connection switch being configured to turn on in response to a multiple connection control signal;
a first switch configured to turn on in response to a first switch signal to provide a detection voltage to the sensing electrode of the selected unit pixel;
an amplifier including a negative input electrode, a positive input electrode configured to receiving a common voltage, and an output electrode;
a second switch coupled between the negative input electrode of the amplifier and the sensing electrode of the selected unit pixel, the second switch being configured to turn on in response to a second switch signal;
a feedback capacitor coupled between the negative input electrode of the amplifier and the output electrode of the amplifier;
a third switch coupled between the negative input electrode of the amplifier and the output electrode of the amplifier, the third switch being configured to turn on in response to the first switch signal; and
a selection switch coupled between the output electrode of the amplifier and a column line, the selection switch being configured to turn on in response to a selection control signal.

6. The fingerprint sensor of claim 5, wherein the controller is further configured to provide the multiple connection control signal, the first switch signal, the second switch signal, and the selection control signal to the signal generation circuit.

7. The fingerprint sensor of claim 5, wherein the controller is further configured to:
provide the multiple connection control signal in an activated state and the selection control signal in the activated state to the selected unit pixel; and
provide the multiple connection control signal in a deactivated state and the selection control signal in the deactivated state to the assistant unit pixel.

8. The fingerprint sensor of claim 7, wherein the controller is further configured to determine a row adjacent to the selected row in a first direction as the assistant row.

9. The fingerprint sensor of claim 7, wherein the controller is further configured to:
provide the first switch signal in the activated state and the second switch signal in the deactivated state to the selected unit pixel during a reset period;
provide the first switch signal in the deactivated state and the second switch signal in the activated state to the selected unit pixel during a detection period; and
provide the first switch signal in the deactivated state and the second switch signal in the deactivated state to the assistant unit pixel during the reset period and the detection period.

10. The fingerprint sensor of claim 9, wherein the selected unit pixel is configured to:
output the common voltage through the column line as a first analog signal during the reset period; and
output a voltage having a magnitude proportional to a sum of a capacitance of the detection capacitor including the sensing electrode of the selected unit pixel and a capacitance of the detection capacitor including the sensing electrode of the assistant unit pixel through the column line as a second analog signal during the detection period.

11. The fingerprint sensor of claim 9, wherein the controller is further configured to alternate the reset period and the detection period a plurality of times while one of the rows included in the pixel array is the selected row.

12. The fingerprint sensor of claim 7, wherein the controller is further configured to determine the assistant row of a current cycle as the selected row in a next cycle.

13. The fingerprint sensor of claim 7, wherein the controller is further configured to determine the selected row of a current cycle as the assistant row in a next cycle.

14. A method of operating a fingerprint sensor including a plurality of unit pixels arranged in rows and columns, each of the plurality of unit pixels including a sensing electrode and a signal generation circuit, the method comprising:
providing at least one dummy row and a plurality of normal rows of unit pixels;
determining one of the rows included in the plurality of normal rows as a selected row and at least one row adjacent to the selected row as an assistant row;
consecutively selecting each of the plurality of normal rows by moving in a unit of a row to determine the selected row;

electrically connecting sensing electrodes included in at least two unit pixels adjacent to each other in the selected row and the assistant row;
turning on one of the signal generation circuits of the at least two unit pixels;
turning off rest of the signal generation circuits of the at least two unit pixels;
generating, by the turned-on signal generation circuit, an analog signal having a magnitude proportional to a sum of capacitances of detection capacitors including the sensing electrodes of the at least two unit pixels; and
generating a digital signal representing a fingerprint pattern of a user based on the analog signal.

15. The method of claim 14, further comprising:
providing a first signal in an activated state and a second signal in a deactivated state to a selected unit pixel in the selected row during a reset period;
providing the first signal in the deactivated state and the second signal in the activated state to the selected unit pixel during a detection period;
providing the first signal in the deactivated state and the second signal in the deactivated state to an assistant unit pixel in the assistant row during the reset period and the detection period; and
alternating the reset period and the detection period a plurality of times for the selected row.

16. The method of claim 14, further comprising:
providing a multiple connection control signal in an activated state and a selection control signal in the activated state to a selected unit pixel in the selected row during a reset period and a detection period; and
providing the multiple connection control signal in a deactivated state and the selection control signal in the deactivated state to an assistant unit pixel in the assistant row during the reset period and the detection period.

17. An electronic device, comprising:
a pixel array including a plurality of unit pixels arranged in rows and columns, wherein each of the plurality of unit pixels includes:
  a sensing electrode configured to form a detection capacitor, and
  a signal generation circuit configured to generate an analog signal based on a capacitance of the detection capacitor; and
a controller configured to control an operation of the pixel array, wherein the controller is configured to:
  determine one of the rows as a selected row and at least one row adjacent to the selected row as an assistant row,
  provide a first signal in an activated state and a second signal in a deactivated state to a selected unit pixel in the selected row during a reset period,
  provide the first signal in the deactivated state and the second signal in the activated state to the selected unit pixel during a detection period,
  provide the first signal in the deactivated state and the second signal in the deactivated state to an assistant unit pixel in the assistant row during the reset period and the detection period,
  alternate the reset period and the detection period a plurality of times for the selected row, and
  during the detection period, electrically connect sensing electrodes of the selected unit pixel and the assistant unit pixel, and activate only the signal generation circuit included in the selected unit pixel to generate the analog signal.

18. The electronic device of claim 17, wherein the controller is further configured to consecutively select each of the rows included in the pixel array by moving in a unit of a row to determine the selected row.

19. The electronic device of claim 17, wherein:
the pixel array includes at least one dummy row and a plurality of normal rows; and
the controller is further configured to consecutively select each of the plurality of normal rows by moving in a unit of a row to determine the selected row.

20. The electronic device of claim 17, wherein the selected unit pixel is configured to:
output a first voltage as a first analog signal during the reset period; and
output a second voltage having a magnitude proportional to a sum of a capacitance of the detection capacitor including the sensing electrode of the selected unit pixel and a capacitance of the detection capacitor including the sensing electrode of the assistant unit pixel as a second analog signal during the detection period.

* * * * *